United States Patent
Ham et al.

(10) Patent No.: US 9,979,018 B2
(45) Date of Patent: May 22, 2018

(54) ELECTRODE ACTIVE MATERIAL, ELECTRODE AND ENERGY STORAGE DEVICE INCLUDING THE SAME, AND METHOD OF PREPARING THE ELECTRODE ACTIVE MATERIAL

(71) Applicant: Samsung Electronics Co., Ltd., Suwon-si, Gyeonggi-do (KR)

(72) Inventors: Dongjin Ham, Hwaseong-si (KR); Jaeman Choi, Seongnam-si (KR); Seungsik Hwang, Seongnam-si (KR); Younhee Lim, Hwaseong-si (KR); Jaejun Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 30 days.

(21) Appl. No.: 15/079,961

(22) Filed: Mar. 24, 2016

(65) Prior Publication Data
US 2016/0344023 A1 Nov. 24, 2016

(30) Foreign Application Priority Data
May 20, 2015 (KR) ........................ 10-2015-0070568

(51) Int. Cl.
*H01M 4/48* (2010.01)
*H01M 4/587* (2010.01)
(Continued)

(52) U.S. Cl.
CPC ........... *H01M 4/483* (2013.01); *H01M 4/049* (2013.01); *H01M 4/364* (2013.01); *H01M 4/583* (2013.01); *H01M 4/587* (2013.01); *H01M 4/62* (2013.01); *H01M 4/366* (2013.01); *H01M 4/386* (2013.01); *H01M 4/387* (2013.01); *H01M 4/485* (2013.01);
(Continued)

(58) Field of Classification Search
CPC ...... H01M 4/483; H01M 4/049; H01M 4/583; H01M 4/364; H01M 4/587; H01M 4/485; H01M 10/0525; H01M 4/62; H01M 2004/028; H01M 4/625; H01M 4/386;
(Continued)

(56) References Cited

U.S. PATENT DOCUMENTS

| 4,925,641 A | 5/1990 | Kitamura et al. |
| 5,474,861 A | 12/1995 | Bito et al. |

(Continued)

FOREIGN PATENT DOCUMENTS

| EP | 2597707 A1 | 5/2013 |
| JP | 200954469 | 3/2009 |

(Continued)

OTHER PUBLICATIONS

Mo, Morphology and composition controlled synthesis of BN-coated aluminum borate nanowhiskers, Advanced Material Research, 2012 (509), 125-131.*

(Continued)

*Primary Examiner* — Cynthia K Walls
(74) *Attorney, Agent, or Firm* — Cantor Colburn LLP

(57) ABSTRACT

Disclosed is an electrode active material including nanostructures including boron-doped alumina. An electrode including the nanostructures, an energy storage device including the electrode, and a method of preparing the electrode active material are also disclosed.

24 Claims, 19 Drawing Sheets

(51) Int. Cl.
*H01M 4/62* (2006.01)
*H01M 4/04* (2006.01)
*H01M 4/36* (2006.01)
*H01M 4/583* (2010.01)
*H01M 4/38* (2006.01)
*H01M 4/485* (2010.01)
*H01M 4/505* (2010.01)
*H01M 4/525* (2010.01)
*H01M 10/052* (2010.01)
*H01M 10/0525* (2010.01)
*H01M 4/02* (2006.01)

(52) U.S. Cl.
CPC ............ *H01M 4/505* (2013.01); *H01M 4/525* (2013.01); *H01M 4/625* (2013.01); *H01M 10/052* (2013.01); *H01M 10/0525* (2013.01); *H01M 2004/028* (2013.01)

(58) Field of Classification Search
CPC ...... H01M 4/366; H01M 4/387; H01M 4/505; H01M 4/525; H01M 10/052
See application file for complete search history.

(56) References Cited

U.S. PATENT DOCUMENTS

| | | |
|---|---|---|
| 7,157,188 B2 | 1/2007 | Yamaguchi et al. |
| 8,486,558 B2 | 7/2013 | Kwon et al. |
| 8,574,744 B1 | 11/2013 | Teeters et al. |
| 8,592,086 B2 | 11/2013 | Sheem et al. |
| 8,658,310 B2 | 2/2014 | Rojeski |
| 9,083,033 B2 | 7/2015 | Chang et al. |
| 9,112,221 B2 | 8/2015 | Park et al. |
| 2010/0119950 A1 | 5/2010 | Hwang et al. |
| 2011/0159382 A1 | 6/2011 | Matsui et al. |
| 2011/0189510 A1 | 8/2011 | Caracciolo et al. |
| 2011/0318650 A1 | 12/2011 | Zhang et al. |
| 2012/0034524 A1 | 2/2012 | Caracciolo et al. |
| 2013/0022870 A1 | 1/2013 | Choi et al. |
| 2013/0083496 A1 | 4/2013 | Franklin et al. |
| 2013/0101884 A1 | 4/2013 | Ueda |
| 2013/0119326 A1 | 5/2013 | Hamada |
| 2013/0171485 A1 | 7/2013 | Kodera et al. |
| 2014/0017577 A1 | 1/2014 | Minami et al. |
| 2014/0079979 A1 | 3/2014 | Kwon et al. |
| 2015/0008374 A1 | 1/2015 | Kim et al. |
| 2015/0072179 A1 | 3/2015 | Itabashi |
| 2016/0329546 A1 | 11/2016 | Ham et al. |
| 2017/0025682 A1 | 1/2017 | Ji et al. |

FOREIGN PATENT DOCUMENTS

| | | | |
|---|---|---|---|
| JP | 2012-204036 | * 10/2012 | ............ H01M 4/36 |
| JP | 2013157120 | 8/2013 | |
| KR | 1020100132839 | 12/2010 | |
| KR | 101066446 | 9/2011 | |
| KR | 101091547 | 12/2011 | |
| KR | 1020120081555 | 7/2012 | |
| KR | 101217780 | 12/2012 | |
| KR | 1020130119700 | 11/2013 | |
| KR | 1020140022723 | 2/2014 | |
| KR | 1020140035689 | 3/2014 | |
| KR | 1020160131266 A | 11/2016 | |

OTHER PUBLICATIONS

Machine translation of JP 2012-204036, retrieved from <https://www.j-platpat.inpit.go.jp/web/all/top/BTmTopEnglishPage> on Aug. 28, 2017.*
Cheol-Min Park, et al., "Enhanced electrochemical properties of nanostructured bismuth-based composites for rechargeable lithium batteries", Journal of Power Sources, 186 (2009): 206-210.
Elssfah, E.M. et al., "A Facile Route for Synthesis of Aluminum Borate Nanowires", Journal of Applied Sciences 6 (5):1047-1057, 2006.
Hung Tran Nguyen, et al., "Alumina-coated silicon-based nanowire arrays for high quiality Li-ion battery anodes", J. Mater. Chem., 2012, 22, 24618-24626.
Insup Lee, et al., "Selective Laser Sintering of Alumina-Boron Oxide Composites", 1994, 339-347.
Martin Fisch, et al., "Crystal-chemistry of mullite-type aluminoborates A118B4O33 and A15B09: A stoichiometry puzzle", Journal of Solid State Chemistry (2010) 11 pp.
Tian-Dan Chen, et al., "Synthesis and microstructure of boron-doped alumina membranes prepared by the sol-gel method", Materials Letters 50, (2001) 353-357.
European Search Report for European Patent Application No. 16166139.2, dated Aug. 23, 2016.

* cited by examiner

ELECTRODE ACTIVE MATERIAL, ELECTRODE AND ENERGY STORAGE DEVICE INCLUDING THE SAME, AND METHOD OF PREPARING THE ELECTRODE ACTIVE MATERIAL

CROSS-REFERENCE TO RELATED APPLICATION

This application claims priority to and the benefit of Korean Patent Application No. 10-2015-0070568, filed on May 20, 2015, and all the benefits accruing therefrom under 35 U.S.C. § 119, the content of which is incorporated herein in its entirety by reference.

BACKGROUND

1. Field

The present disclosure relates to electrode active materials, electrodes and energy storage devices including the same, and to methods for preparing the electrode active materials.

2. Description of the Related Art

Lithium batteries, (e.g., lithium secondary batteries in energy storage devices), are high performance secondary batteries having the highest energy densities available among present commercially secondary batteries, Lithium batteries may be widely applied to a various fields ranging from portable electronic devices to plug-in hybrid electric vehicles, and electric vehicles.

Carbonaceous materials may be used as a negative electrode of a lithium secondary battery. Such carbonaceous materials have excellent charge-discharge characteristics, and electrochemical stabilities of the battery are secured in the carbonaceous materials. However, the carbonaceous materials may have low capacities. Due to inherent spherical characteristics of the carbonaceous materials, when the carbonaceous materials are applied to a flexible lithium secondary battery, high levels of stripping are generated during bending of the flexible lithium secondary battery resulting in deterioration of the capacity and lifetime of the battery.

SUMMARY

In an aspect, the present disclosure provides electrode active materials with improved binding strength.

In other aspect, the present disclosure provides electrodes including the electrode active materials.

In another aspect, the present disclosure provides energy storage devices which have improved durability and lifetime characteristics by including the negative electrodes.

In still another aspect, the present disclosure provides methods for preparing the electrode active materials, the method that are capable of easily preparing electrode active materials including uniform sized nanostructures.

Additional aspects will be set forth in part in the description which follows and, in part, will be apparent from the description.

According to an aspect, an electrode active material including a nanostructure including boron-doped alumina is provided.

According to other aspect, an electrode including a current collector; and a layer including the above-described electrode active material formed on the current collector is provided.

According to another aspect, an energy storage device including the above-described electrode is provided.

According to still another aspect, a method of preparing an electrode active material includes contacting an alumina precursor with a mixture of a boron precursor and a solvent to form a precursor containing aluminum and boron; and heating the precursor containing aluminum and boron to form a nanostructure including a boron-doped alumina.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
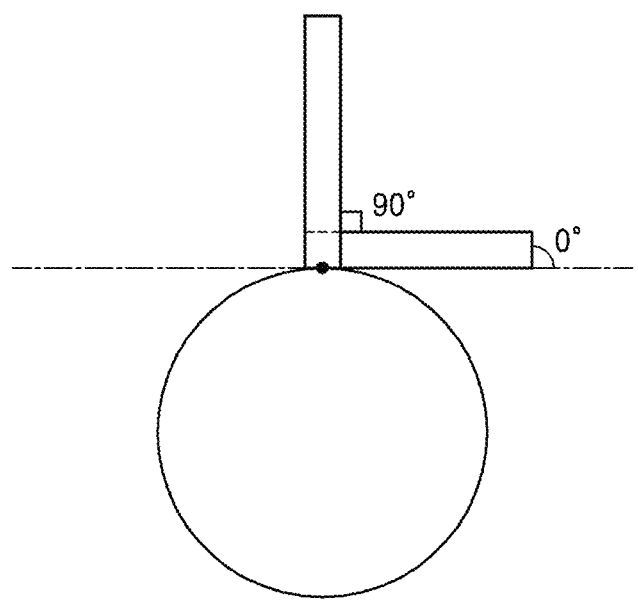
FIG. 1A is a schematic diagram of a core active material in which a nanostructure is disposed on the surface at an angle of 0 degrees or about 90 degrees with respect to a horizontal axis passing through a point on the surface of the core active material.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or."

Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present. In addition, it will be understood that when a layer, region, or component is referred to as being "formed on," another layer, region, or component, it can be directly or indirectly formed on the other layer, region, or component. That is, for example, intervening layers, regions, or components may be present. In addition, the expression "combination thereof" refers to a mixture or combination of at least one of listed elements.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be further understood that the terms "comprises" and/or "comprising" used herein specify the presence of stated features or components, but do not preclude the presence or addition of one or more other features or components.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrode active material, an electrode, and an energy storage device including the same, as well as a method for preparing the electrode active material, are described in detail with reference to the accompanying drawings.

An electrode active material according to an aspect of the present disclosure includes a nanostructure including a boron-doped alumina.

In general, the term "nanostructure" is commonly used to refer to a structure having a diameter of nanosized level.

In the present disclosure, "nanostructure" means a one-dimensional structure having a diameter of nanosized (i.e. nanoscale) level and an aspect ratio of more than 1 such that the one-dimensional structure is not point-contacted, but is surface-contacted with adjacent components. The "nanostructure" has at least a dimension (e.g. a diameter) of about 1 nanometer (nm) to about 100 nm, and includes both "a single" nanostructure and "a plurality of" nanostructures.

As used herein, the term "nanostructure" excludes zero-dimensional nanoparticles and two-dimensional nanosheets.

In an embodiment, an electrode active material includes boron-doped alumina. The boron-doped alumina is a single crystal structure, and has a compressive strength about 2.54 times to about 3 times higher than alumina. Further, the boron-doped alumina has a tensile strength about 8 times to about 40 times higher than alumina. Due to the increased strength of the boron-doped alumina, an energy storage device (e.g., an energy storage device requiring flexibility) including the electrode active material, may have improved bending durability.

An electrode active material includes boron-doped alumina as a nanostructure such that a contact portion is increased between adjacent components, such as, for example, between a current collector and an electrode active material or/and between electrode active material particles. When the nanostructure is a plurality of nanostructures, the contact portion is further increased between the current collector and the electrode active material or/and between the electrode active material particles. Due to the increased contact, the electrode active material may have improved binding strength between the current collector and the electrode active material or/and between the electrode active material particles, and an energy storage device including the electrode active material may have improved bending durability.

An electrode active material according to an embodiment may include a core active material, and a nanostructure including boron-doped alumina disposed on the surface of the core active material.

An electrode active material according to an embodiment may include a core material and a nanostructure including boron-doped alumina, the nanostructure being disposed on the contact position of the core active material surface.

As used herein, the term "disposed" includes all forms in which a member is placed in a position of contact with the core active material surface or is interposed between the core active material and the nanostructure such that the member is placed on the core active material surface or is embedded in the core active material surface.

An electrode active material according to an embodiment may include a core material and a nanostructure including grown boron-doped alumina, the nanostructure being disposed on the contact position of the core active material surface. The nanostructure has uniform diameter, length, or aspect ratio, and may be uniformly disposed on a portion of the surface or on the entire surface of the core active material.

The electrode active material may have improved binding strength between the current collector and the electrode active material or/and between the electrode active material particles by increasing the contact portion (e.g. contact area) between the current collector and the nanostructure disposed on the core active material surface or/and between adjacent electrode active material particles, while simultaneously utilizing the excellent electrochemical properties of a core active material. Further, an energy storage device including the electrode active material may have improved bending durability. Further, a nanostructure including boron-doped alumina may extend the lifetime of the energy storage device by due to the formation of a hydrogen bond between the alumina included in the nanostructure and hydrogen fluoride (HF) produced by a side reaction between the core active material and an electrolyte to remove $H^+$, thereby decreasing the content of HF as a side reaction product.

The electrode active material according to an embodiment may comprise a composite including the nanostructure including boron-doped alumina. The electrode active material may or may not include pores. If the electrode active material includes pores, the nanostructure including boron-doped alumina may be included on the inside of the pores, the outside of the pores, or/and in the spaces between the pores. If the electrode active material does not include the pores, the nanostructure may be dispersed into the electrode active material.

For example, the nanostructure including boron-doped alumina may be a composite blended with an electrode active material that is free of pores. The ratio of the electrode active material to the nanostructure in the composite may be any ratio suitable to the desired performance of an energy storage device.

In an embodiment, the nanostructure including boron-doped alumina according to an embodiment may be at least one of a nanowire, a nanorod, a nanobelt, and a nanoribbon. "Nanowire" refers to a wire which has a diameter on a nanoscale level, which is not limited by its length, and which has an aspect ratio of about 100 or more. "Nanorod" refers to a structure having a rod shape, which has a diameter on a nanoscale level, which has a relatively large diameter and a short length as compared to the nanowire, and which has an aspect ratio of less than about 100. "Nanobelt" refers to a belt-like structure having both a thickness and width on a nanoscale level. "Nanoribbon" refers to a ribbon structure which has a width on a nanoscale level and an aspect ratio of about 10 or more.

In an embodiment, the nanostructure including boron-doped alumina may be at least one of a nanowire and a nanorod. In another exemplary embodiment, the nanostructure may be a nanorod.

The nanostructure including boron-doped alumina according to an embodiment may have an aspect ratio of about 1 to about 200.

According to some embodiments, a nanostructure including boron-doped alumina may have an aspect ratio range of about 1 to about 100, specifically about 1 to about 50, more specifically, about 1 to about 30, even more specifically about 1 to about 20, or yet even more specifically, about 5 to about 10. In one embodiment, the nanostructure has an aspect ratio of 10 or less. An electrode active material including nanostructures having an aspect ratio within the described range may have appropriate nanostructure packing density on the core active material surface. As a result, the binding strength between a current collector and the electrode active material or/and between electrode active material particles may be further improved.

The boron-doped alumina according to an embodiment may include boron-doped alumina represented by Formula 1:

$$Al_xB_yO_z \qquad \text{[Formula 1]}$$

wherein 1≤x<30, 1≤y<10, and 1≤z<40. For example, 1≤x<20, 1≤y<5, and 1≤z<35.

Examples of boron-doped alumina may include at least one of $AlBO_3$, $Al_4B_2O_9$, $Al_5BO_9$, and $Al_{18}B_4O_{33}$. In one embodiment, the boron-doped alumina may include at least one of $Al_5BO_9$ and $Al_{18}B_4O_{33}$. $Al_5BO_9$ may be represented by $5Al_2O_3 \cdot B_2O_3$, and $Al_{18}B_4O_{33}$ may be represented by $9Al_2O_3 \cdot 2B_2O_3$. The boron-doped alumina may be $Al_{18}B_4O_{33}$ having an orthorhombic crystal structure.

FIG. 1A is a schematic diagram showing a structure, such as a core material, in which the nanostructure is disposed at an angle of 0 degrees to about 90 degrees with respect to a horizontal axis passing through a point that contacts the surface of a core active material.

In an embodiment, the nanostructure including boron-doped alumina may be disposed on a surface of the core material at an angle of 0 degrees to about 90 degrees with respect to a horizontal axis passing through a contact point one the core active material surface.

As shown in FIG. 1A, the nanostructure including boron-doped alumina may be disposed at a minimum angle of 0 degree up to a maximum angle of about 90 degrees. In other words, the nanostructure may be disposed on the surface of the core active material surface without limitation in either the direction or angle of the nanostructure with respect to the horizontal axis.

Figure 1B:
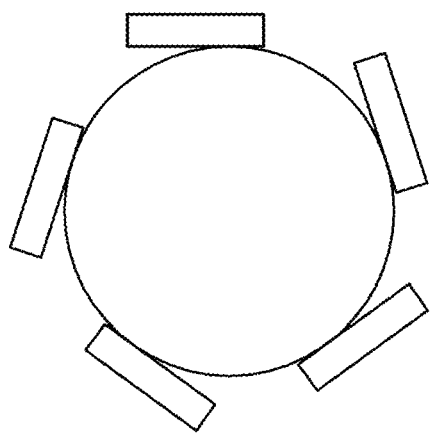
FIG. 1B is a schematic diagram of an embodiment of the electrode active material structure according to Example 1.

FIG. 1B is a schematic diagram of an electrode active material structure according to an embodiment (Example 1).

Referring to FIG. 1B, a nanostructure including boron-doped alumina may be a plurality of nanostructures, and the plurality of nanostructures may be nanostructures which are disposed at an angle of 0 degrees with respect to the horizontal axis passing through a contact point on the core active material surface. Put another way, the plurality of nanostructures may be disposed on the surface in parallel to the horizontal axis.

An electrode active material including a plurality of nanostructures disposed in parallel on the core active material surface may improve binding strength between the current collector and the electrode active material or/and between the electrode active material particles by two or more times as compared to the core active material alone. Without being limited by theory, it is believed that this effect occurs by greatly increasing the area as well as number of the contact points between the current collector and the electrode active material. Due to this, an energy storage device including the electrode active material may have significantly improved bending durability. Further, the energy storage device including the electrode active material may have improved lifetime characteristics of about 5% or more as compared to the core active material alone.

Figure 1C:
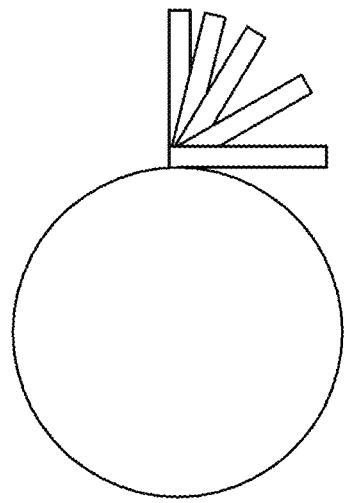
FIG. 1C is a schematic diagram of an embodiment of the electrode active material structure according to Example 2.

FIG. 1C is a schematic diagram of an exemplary embodiment of an electrode active material structure (Example 2).

Referring to FIG. 1C, a nanostructure including boron-doped alumina includes a plurality of nanostructures, and the plurality of nanostructures may be a combination of nanostructures which are disposed equally or differently at an angle of 0 degrees to about 90 degrees with respect to the horizontal axis passing through the contact point on the core active material surface.

An electrode active material including the combination of the plurality of nanostructures which are disposed equally or differently at an angle of 0 degree to about 90 degrees with respect to the horizontal axis passing through the contact point of the core active material surface, may improve binding strength by about 10% or more as compared to the core active material alone. Again, without being limited by theory, it is believed the increase in binding strength occurs by increasing the number of the contact portions between adjacent electrode active material particles. Further, an energy storage device including the electrode active material may have its lifetime characteristics improved by about 3% or more as compared to the core active material alone.

The core active material may be an active material capable of intercalating and deintercalating, lithium ions. As used herein, the terms "intercalating" and "intercalation" or "deintercalating" and "deintercalation" refer to the insertion or deinsertion, respectively, of an ion (e.g. a lithium ion) in the core active material structure. The active materials capable of intercalation and deintercalation of lithium ions may include at least one of a metal oxide, a metal composite oxide, a lithium metal oxide, a lithium metal composite oxide, a carbonaceous material, silicon, a silicon oxide, tin, and a tin oxide.

Examples of the metal oxide may include transition metal oxides. Examples of the metal composite oxide may include both the transition metal oxides, as well as composite oxides of at least one Group 1, Group 2, Group 14, and Group 15 metal or metalloid Examples of the lithium metal oxide may include lithium transition metal oxides.

Examples of the lithium metal composite oxide may include compounds represented by at least one of formulas selected from: $Li_aAl_{1-b}B'_bD'_2$ (wherein, $0.90 \leq a \leq 1.8$ and $0 \leq b \leq 0.5$); $Li_aE_{1-b}B'_bO_{2-c}D'_c$ (wherein, $0.90 \leq a \leq 1.8$, $0 \leq b \leq 0.5$, and $0 \leq c \leq 0.05$); $LiE_{2-b}B'_bO_{4-c}D'_c$ (wherein, $0 \leq b \leq 0.5$ and $0 \leq c \leq 0.05$); $Li_aNi_{1-b-c}Co_bB'_cD'_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein, $0.90 \leq a \leq 1.8$, $0 \leq b \leq 0.5$, $0 \leq c \leq 0.05$, and $0 < \alpha < 2$) $Li_aNi_{1-b-c}Mn_bB'_cD'_\alpha$ (wherein, $0.90 \leq a \leq 1.8$, $0 \leq b \leq 0.5$, $0 \leq c \leq 0.05$, and $0 < \alpha < 2$), $Li_aNi_{1-b-c}Mn_bB'_cO_{2-\alpha}F'_\alpha$ (wherein, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein, $0 \leq f \leq 2$); $Li_{(3-f)}Fe_2(PO_4)_3$ (wherein, $0 \leq f \leq 2$); and $LiFePO_4$.

In the above lithium metal composite oxides formulas, A is Ni, Co, Mn, or a combination thereof; B' is Al, Ni, Co, Mn, Cr, Fe, Mg, Sr, V, a rare earth element, or a combination thereof; D' is O, F, S, P, or combinations thereof; E is Co, Mn, or a combination thereof; F' is F, S, P, or combinations thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

Specific examples of the lithium metal oxide and the lithium metal composite oxide may include $Li_xCoO_2$ ($0.5 < x < 1.3$), $Li_xNiO_2$ ($0.5 < x < 1.3$), $Li_xMnO_2$ ($0.5 < x < 1.3$), $Li_xMn_2O_4$ ($0.5 < x < 1.3$), $Li_x(Ni_aCo_bMn_c)O_2$ ($0.5 < x < 1.3$, $0 < a < 1$, $0 < b < 1$, $0 < c < 1$, $a+b+c=1$), $Li_xNi_{1-y}Co_yO_2$ ($0.5 < x < 1.3$, $0 < y < 1$), $Li_xCo_{1-y}Mn_yO_2$ ($0.5 < x < 1.3$, $0 \leq y < 1$), $Li_xNi_{1-y}Mn_yO_2$ ($0.5 < x < 1.3$, $0 \leq y < 1$), $Li_x(Ni_aCo_bMn_c)O_4$ ($0.5 < x < 1.3$, $0 < a < 2$, $0 < b < 2$, $0 < c < 2$, $a+b+c=2$), $Li_xMn_{2-z}Ni_zO_4$ ($0.5 < x < 1.3$, $0 < z < 2$), $Li_xMn_{2-z}Co_zO_4$ ($0.5 < x < 1.3$, $0 < z < 2$), $Li_xCoPO_4$ ($0.5 < x < 1.3$), $Li_xFePO_4$ ($0.5 < x < 1.3$), and a combination thereof.

The lithium metal oxide and the lithium metal composite oxide may be coated with a metal (e.g. aluminum, etc.) or a metal oxide. Further, if desired, the lithium metal oxide and the lithium metal composite oxide may be blended with sulfides, selenides, halides, etc.

Examples of silicon and silicon oxide may include Si, $SiO_x$ ($0 < x < 2$, e.g., $0.5 < 1.5$), while examples of tin and tin oxide may include Sn, and $SnO_2$. Further examples of silicon, silicon oxide may include silicon-containing metal alloys and mixtures thereof. Metals capable of forming the silicon-containing metal alloys may include at least one of Al, Sn, Ag, Fe, Bi, Mg, Zn, In, Ge, Pb, and Ti.

Further, the silicon, silicon oxide, tin, and tin oxide may also include metals/metalloids that are alloyable with lithium, and alloys or oxides thereof. Examples of metals/metalloids that are alloyable with lithium may include Si, Sn, Al, Ge, Pb, Bi, Sb, Si—Y' alloys (where Y' is an alkali metal, alkali earth metal, Group 13 element, Group 14 element, transition metal, rare earth element or a combination thereof, with Y' not being Si), Sn—Y' alloys (where Y' is an alkali metal, alkali earth metal, Group 13 element, Group 14 element, transition metal, rare earth element or a combination thereof, with Y' not being Sn), $MnO_x$ (0<x≤2), etc. Examples of the element Y' may include Mg, Ca, Sr, Ba, Ra, Sc, Y, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof. Examples of the oxides of the metals/metalloids that are alloyable with lithium may include lithium titanium oxide, vanadium oxide, lithium vanadium oxide, $SnO_2$, $SiO_x$ (0<x<2), etc.

In an embodiment, the core active material may include a carbonaceous material. The carbonaceous material may include at least one of natural graphite, artificial graphite, soft carbon, hard carbon, mesophase pitch carbide, calcined cokes, graphene, carbon black, fullerene soot, carbon nanotube, carbon fiber, carbon nanosheet or a combination thereof. In one embodiment, the carbonaceous material may include at least one of natural graphite, artificial graphite, soft carbon, hard carbon, mesophase pitch carbide, and calcined cokes. The natural graphite or artificial graphite may be formed in an amorphous, plate-shaped, flake, spherical, or fibrous form. For example, the artificial graphite may be isotropic artificial graphite particles in which graphite is randomly oriented. The carbonaceous materials may have oxygen-containing functional groups such as —OH and —COOH and polymer substituents such as polyethylene oxide (PEO) and polyethylene glycol (PEG) attached to their surfaces. The carbonaceous materials may also include a fluorine-containing organic polymer coating layer. Further, the carbonaceous materials may have metal nanoparticles or metalloid nanoparticles added thereto, or the carbonaceous materials may have a tin salt, a cobalt salt, or an iron salt mixed therewith.

The carbonaceous materials may have an average particle diameter range of about 1 nm to about 900 nm, more specifically, about 1 nm to about 100 nm, or even more specifically, about 1 nm to about 50 nm. For example, the carbonaceous materials may have a specific surface area range of about 1.0 square meter per gram ($m^2/g$) or more, or 3.0 $m^2/g$ or more as measured based on the Brunauer-Emmett-Teller (BET) surface area analysis.

A core active material formed of a carbonaceous material is electrochemically stable and has excellent charge/discharge characteristics. Therefore, an energy storage device including a carbonaceous, core active material may demonstrate improved capacity and lifetime characteristics.

In an embodiment, the nanostructures including boron-doped alumina may contain aluminum in an amount from about 0.1 parts by weight to about 99.99 parts by weight based on 100 parts by weight of the core active material.

For example, the nanostructures including boron-doped alumina according to an embodiment may contain aluminum in an amount from about 0.1 parts by weight to about 20 weight parts, more specifically, about 0.1 parts by weight to about 12 weight parts, or even more specifically, about 0.1 parts by weight to about 7.0 parts by weight based on 100 parts by weight of the core active material. For example, if the nanostructures including boron-doped alumina contain aluminum in an amount from about 0.1 parts by weight to about 7.0 weight parts, the nanostructures are disposed on the surface of the core active material in the manner illustrated in the electrode active material of FIG. 1B. For example, if the nanostructures including boron-doped alumina contain aluminum in an amount from about 7.0 parts by weight to about 20 weight parts, the nanostructures are disposed on the surface of the core active material in the manner illustrated in the electrode active material of FIG. 1C.

When the electrode active material includes the nanostructures containing aluminum in the above-described amount ranges, and when the nanostructures have appropriate aspect ratios and packing densities on the core active material surface, the binding strength between the current collector and the electrode active material or/and between electrode active material particles may be further improved. Due to increased binding strength, an energy storage device including the electrode active material may have improved bending durability and lifetime characteristics.

In an embodiment, an electrode active material may further include a carbon based coating layer formed on the surfaces of the nanostructure including boron-based alumina. For example, the carbon based coating layer may be an amorphous carbon, a low crystalline carbon, or a combination thereof. The carbon based coating layer may partially cover, or completely cover the surface of the nanostructure. The carbon based coating layer provides an electrical conducting path to improve electrical conductivity of the electrode active material, and prevents a side reaction between the electrode active material and an electrolyte during charging and discharging thereby suppressing decomposition of the electrolyte and improving charge/discharge efficiencies.

The carbon based coating layer may be present in an amount of about 0.1 parts by weight to about less than 5.0 weight parts, or more specifically, about 0.1 parts by weight to about less than 2.0 parts by weight, based on 100 parts by weight of the electrode active material.

The carbon based coating layer may have a thickness of about 0.1 nm to about 10 nm, specifically, about 0.1 nm to about 8 nm, more specifically, about 0.1 nm to about 5 nm, even more specifically, about 0.1 nm to about 3 nm, or yet even more specifically, about 0.1 nm to about 1.5 nm. An electrode active material including a carbon based coating layer having a thickness within this range, may demonstrate improved charge/discharge efficiencies and lifetime characteristics by minimizing resistance when transferring electrical charges to surfaces of the nanostructures.

In an embodiment, the electrode active material t may be a positive electrode active material or a negative electrode active material. In one embodiment, the electrode active material may be a negative electrode active material.

If desired, the electrode active material may additionally include a binder or/and a conducting agent. Representative examples of the binder may include polyacrylate (PAA), lithium polyacrylate (LiPAA), vinylidene fluoride-hexafluoropropylene copolymers, polyvinylidene fluoride, polyacrylonitrile, polymethyl methacrylate, polytetrafluoroethylene (PTFE), styrene butadiene rubber-based polymers, etc. Representative examples of the conducting agent may include: carbon black, graphite particles, natural graphites, artificial graphites, acetylene black, Ketjen black, carbon fibers, carbon nanotubes, metal powders, metal fibers, or metal tubes such as copper, nickel, aluminum, silver, etc; and conductive polymers such as polyphenylene derivatives. However, the conducting agent is not limited thereto. The electrode active material, binder, and conducting agent may be contained in any amount suitable for use in an energy storage device.

In an embodiment, the electrode may include a current collector and a layer that is formed on the current collector, where the layer includes the above-described electrode active material.

Figure 2A:
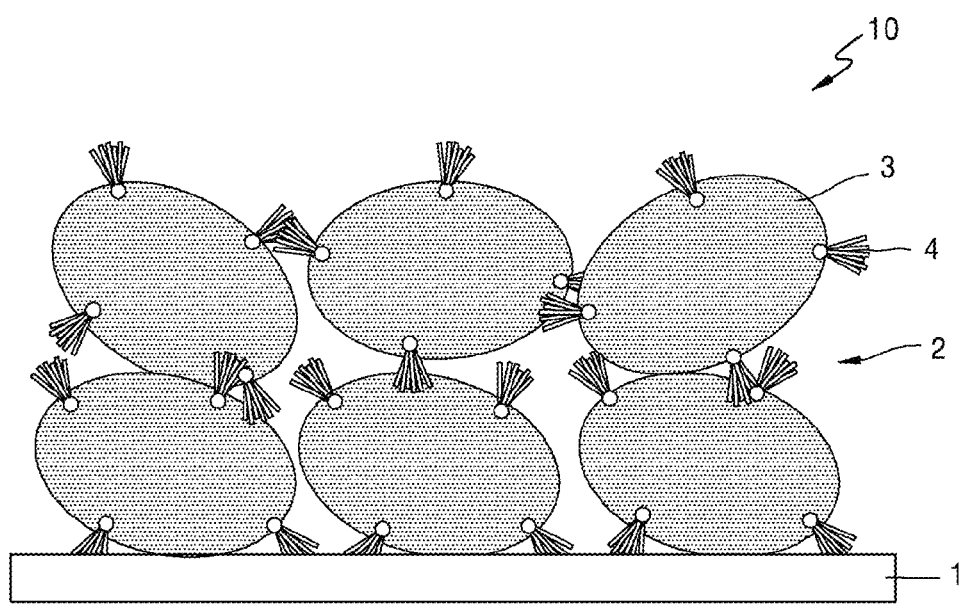
FIG. 2A is a schematic diagram of an embodiment of an electrode.
Figure 2B:
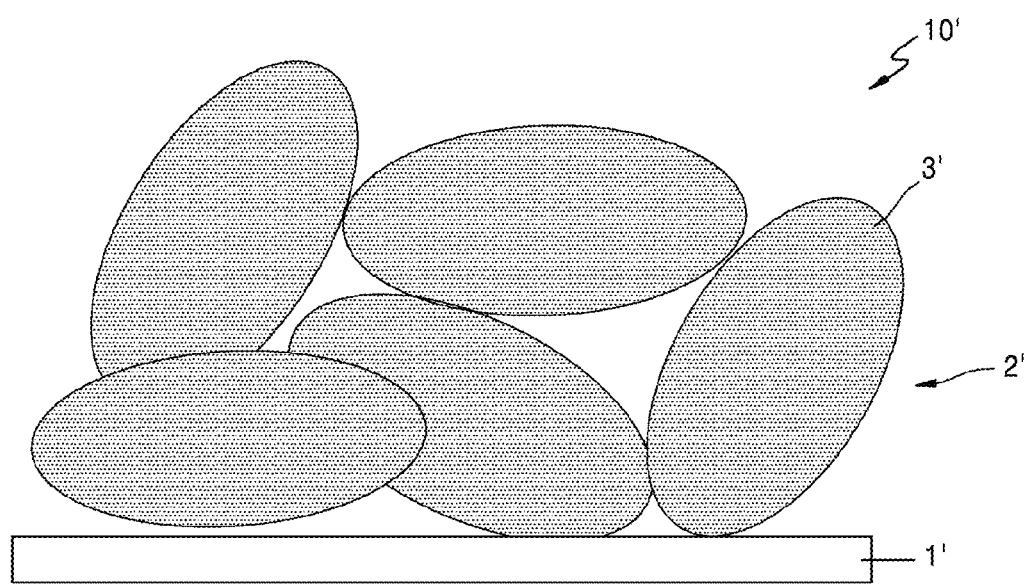
FIG. 2B is a schematic diagram of a general electrode of the prior art.

FIG. 2A is a schematic diagram of an electrode 10 according to an embodiment. FIG. 2B is a schematic diagram of a general electrode 10' of the prior art.

Referring to FIG. 2A, an electrode active material layer 2 including a core active material 3, and nanostructures including boron-doped alumina 4 disposed on the surface of the core active material 3, is disposed on a current collector 1. The electrode may have improved binding strength by increasing number or/and area of the contact points between a current collector and an electrode active material layer or/and between electrode active material particles, due to the presence of the nanostructures including boron-doped alumina disposed on the core active material surface. Further, an energy storage device including the electrode may have improved bending durability and lifetime characteristics.

Referring to FIG. 2B, a general electrode 10' includes an electrode active material layer 2', including a core active material 3' disposed on the surface of a current collector 1. The binding strength of a general electrode and the bending durability of an energy storage device including the electrode are reduced due to the absence of the nanostructures including boron-doped alumina on the surface of the core active material. As a result, the number or/and area of the contact points between the current collector and the electrode active material layer or/and between the electrode active material particles is very small.

In an embodiment, the electrode may be a negative electrode or a positive electrode. In an exemplary embodiment, the electrode may be a negative electrode.

Next, a method of preparing a negative electrode may be is described as follows.

A negative electrode may be prepared by mixing a negative electrode active material, a binder, and a solvent, thereby preparing a negative electrode active material composition. According to the need, a conducting agent may also be included the negative electrode active material composition. The negative electrode may be prepared by directly coating and drying the negative electrode active material composition on a copper current collector, thereby forming a negative electrode active material layer. Alternatively, the negative electrode may be prepared by casting the negative electrode active material composition on a separate support, stripping the negative electrode active material composition from the separate support to obtain a film, and laminating the film on the copper current collector.

Representative examples of the solvent may include N-methylpyrrolidone (NMP), acetone, water, etc. However, the solvent is not limited thereto, and may include any suitable solvent material.

The negative electrode may also include a general negative electrode active material in addition to the above-described negative electrode active material. Examples of the general negative electrode active material may include materials that are generally usable as a negative electrode, including, for example, materials capable of intercalation and deintercalation of lithium ions.

A positive electrode may be prepared using the same method as the negative electrode except that a positive electrode active material, instead of the negative electrode active material, is used.

For example, the positive electrode may be prepared as follows.

A positive electrode active material composition may be prepared by mixing a positive electrode active material, a binder, and a solvent. A conducting agent may optionally be added to the mixture of the positive electrode active material, the binder, and the solvent depending on the need, and a positive electrode may be prepared by directly coating the positive electrode active material composition on an aluminum current collector. Alternatively, the positive electrode may be prepared by casting the positive electrode active material composition on a separate support, stripping the formed positive electrode active material film from the support, and laminating the positive electrode active material film on the aluminum current collector.

The positive electrode may also include a general positive electrode active material in addition to the above-described positive electrode active material. Examples of the general positive electrode active material may include materials that are generally usable as the positive electrode, including, for example, materials capable of intercalation and deintercalation of lithium ions.

The positive electrode active material composition may include the same conducting agent, binder, and solvent as those used in the negative electrode active material composition. In some cases, the negative electrode active material composition and the positive electrode active material composition further include a plasticizer to enable pores to be formed in electrode plates.

The positive electrode active material or negative electrode active material, the conducting agent, the binder, and the solvent are included in amount levels similar to those in which they are ordinarily used in an energy storage device. Depending upon the use and construction of the energy storage device, at least one of the conducting agent, binder, and solvent may be omitted.

In another aspect, an energy storage device according to the present disclosure may include the above-described electrode. The energy storage device may be a battery, a capacitor, or a super capacitor. For example, the energy storage device may be a primary battery or a secondary battery. Specifically, the energy storage device may be a lithium secondary battery. More specifically, the energy storage device may be a flexible lithium secondary battery. The above-described electrode is appropriately applied to the flexible lithium secondary battery due to its good bending durability. Examples of a battery form may include a cylindrical form, etc. without limitation, as well as a pouch type lithium secondary battery.

Figure 4:
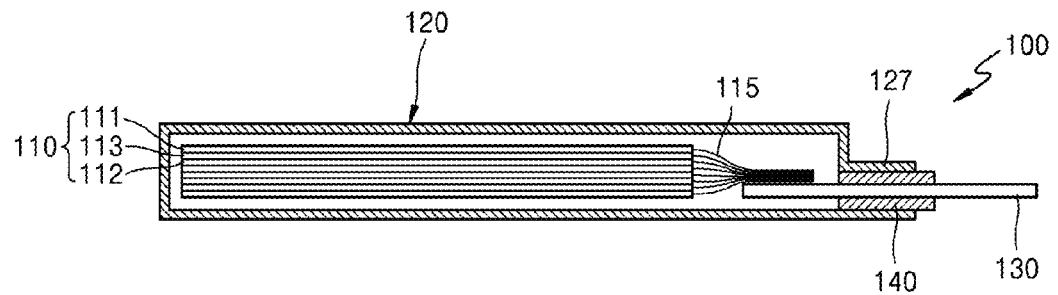
FIG. 4 is a schematic cross-sectional view of an embodiment of a pouch type lithium secondary battery structure.

FIG. 4 is a schematic cross-sectional view of an embodiment of a structure of a pouch type lithium secondary battery 100.

Referring to FIG. 4, a pouch type lithium secondary battery 100 includes an electrode assembly 110, a lead tab 130, and a case 120 having an electrolyte inlet 127. Examples of a pouch type lithium secondary battery 100 may include lithium-ion batteries as rechargeable secondary batteries.

The electrode assembly 110 is accommodated within the case 120. The electrode assembly 110 includes a positive electrode plate 111, a negative electrode plate 112, and a separator 113 interposed between the positive electrode plate 111 and the negative electrode plate 112. The electrode assembly 110 may be a lamination type electrode assembly in a state such that the positive electrode plate 111, the separator 113, and the negative electrode plate 112 are sequentially laminated. A plurality of sheets of positive electrode plates 111, separators 113, and negative electrode plates 112 may be laminated in order to provide a pouch type battery 100 having a high output power and a large capacity.

A positive electrode plate 111 may be formed by coating the above-described positive electrode active material on the surface of a positive electrode current collector formed of a material such as aluminum, etc. Alternatively, as described previously, the positive electrode plate may be prepared by preparing a positive electrode active material composition in which a binder, a conducting agent, and a solvent are mixed with the positive electrode active material.

The negative electrode plate 112 may be formed by coating a negative electrode active material on the surface of a negative electrode current collector formed of a material such as nickel, copper, etc. Alternatively, as described previously, a negative electrode plate is prepared by preparing a negative electrode active material composition in which a binder, a conducting agent, and a solvent are mixed with the negative electrode active material.

In an embodiment, the electrolyte may be a liquid electrolyte. The liquid electrolyte may be an organic electrolyte. The organic electrolyte may be prepared by dissolving a lithium salt in an organic solvent.

The organic solvent may be any materials that are capable of being used as an organic solvent. Representative examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl acetamide, dimethyl sulfoxide, dioxane, 1,2-dimethoxyethane, sulfolane, dichloroethane, chlorobenzene, nitrobenzene, diethylene glycol, dimethyl ether, and mixtures thereof.

The lithium salt may also include any materials that are capable of being used as the lithium salt. Representative examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and mixtures thereof.

In some embodiments, the electrolyte may include a gel electrolyte or a solid electrolyte besides the liquid electrolyte. Examples of the solid electrolyte may include a boron oxide, lithium oxynitride, etc., but is not limited thereto, and the solid electrolyte may be any materials capable of being used as the solid electrolyte. The gel electrolyte or the solid electrolyte may be formed on a negative electrode by methods such as sputtering, etc.

The separator 113 may be an insulating thin film having high ion permeability and mechanical strength. In general, the separator may have a pore diameter range of about 0.01 micrometer (μm) to about 10 μm, and a thickness range of about 5 μm to about 20 μm. Examples of the separator 113 may include olefin based polymers such as polypropylene, etc., a sheet or a nonwoven fabric formed of glass fiber or polyethylene, etc. When a solid polymer electrolyte is used as an electrolyte, the solid polymer electrolyte may also be used as the separator.

Specific examples of the separator 113 may include a multilayer separator consisting of two layers or more layers of polyethylene, polypropylene, polyvinylidene fluoride, or a combination thereof. Specific examples of the separator 113 may include a two layered polyethylene/polypropylene separator, a three layered polyethylene/polypropylene/polyethylene separator, a three layered polypropylene/polyethylene/polypropylene separator, etc.

In an embodiment, a lithium secondary battery has excellent capacity and lifetime characteristics. For example, the lithium secondary battery may be used in a battery cell as a power source for a small device, as a unit battery in a medium to large sized battery pack, or a battery module including a plurality of battery cells used as a power source for a medium to large device.

Examples of the medium to large sized device may include electric cars including electric vehicles (EVs), hybrid electric vehicles (HEVs), plug-in hybrid electric vehicles (PHEVs), electric two-wheeled vehicles including E-bikes and E-scooters, electric tools, power storage systems, etc. However, the medium to large sized device is not limited thereto.

Further, the positive electrode plate 111 and the negative electrode plate 112 may have electrode tabs 115 electrically connected thereto. The electrode tabs 115 extend from the positive electrode plate 111 and the negative electrode plate 112 and overlap each other. The electrode tabs 115 formed in such a form that they are connected to each other are electrically connected to the lead tab 130. For example, the electrode tabs 115 and the lead tab 130 may be bonded to each other by methods such as ultrasonic welding, etc.

The lead tab 130 is extended toward the outside from the top of the exterior material 120. The lead tab 130 may be surrounded by a tab tape 140 to improve sealability and electrical insulation of the exterior material 120.

An example of the pouch type lithium secondary battery may include a laminate type electrode assembly 110. However, the pouch type lithium secondary battery is not limited thereto. For example, a lithium ion polymer battery may be manufactured by laminating an electrode assembly 110 in a bicell structure, impregnating the laminated electrode assembly with an organic electrolytic solution, accommodating the resulting material into a pouch, and sealing the pouch containing the resulting material.

On the other hand, the electrode assembly 110 may be a winding type electrode assembly obtained by winding the laminate in a jelly roll form after laminating a positive electrode plate, a separator, and a negative electrode plate to form a laminate.

The exterior material 120 is a pouch type exterior material and includes an internal space for housing the electrode assembly 110 and the electrolytic solution. For example, the exterior material 120 may be a metal foil having an externally exposed face and an inner face formed of an insulation layer, wherein the inner face of the metal foil houses the electrode assembly 110. The exterior material 120 may be made from a material such as aluminum and stainless steel.

The exterior material 120 may comprise an electrolytic solution inlet 127 projected from one side of the exterior material 120.

In another aspect, a method of preparing an electrode active material according to the present disclosure includes contacting an alumina precursor with a mixture of a boron precursor and a solvent to form a precursor containing aluminum and boron, and heating the precursor containing aluminum and boron to form the nanostructure including boron-doped alumina.

The method of preparing the electrode active material may be used to prepare nanostructures having uniform diameter and length with minimal to no impurities by synthesizing a precursor containing aluminum and boron in a solution, without the need for a catalyst such as Au and $Fe_2O_3$, and heating the synthesized precursor containing aluminum and boron, thereby forming a nanostructure including boron-doped alumina.

First, an alumina precursor is prepared. An example of the alumina precursor may be aluminum borate, e.g., $Al(NO_3)_3 \cdot 9H_2O$. Specifically, the alumina precursor may be an aluminum-containing solution in which aluminum is mixed with a solvent. Examples of the solvent may include water, NaOH, etc. The aluminum-containing solution may have a pH range of about 11 to about 14. A desired gel-type precursor containing aluminum and boron may be formed when the pH-adjusted aluminum-containing solution is added to the mixture of the boron precursor and solvent within the pH range.

Next, a mixture of a boron precursor and a solvent is prepared. The boron precursor may be sodium borohydride ($NaBH_4$). In general, sodium borate ($Na_2B_4O_7$) has previously been used as the boron precursor. In an embodiment, the boron precursor used in a method of preparing an electrode active material s $NaBH_4$ as a reducing agent. A mixture of $NaBH_4$ and a solvent, e.g. $H_2O$, is prepared, wherein $NaBH_4$ and $H_2O$ are mixed at a molar ratio of about 1:150 to about 1:450. The mixture may be boron hydride obtained by a hydrolysis reaction between $NaBH_4$ and $H_2O$. As a result, the boron hydride may thus be in a liquid form. Accordingly, when an alumina precursor is contacted with a boron precursor, a uniform amount of a precursor containing aluminum and boron may be formed. As a result, nanostructures of boron-doped alumina having a uniform diameter and length may be obtained.

The alumina precursor is contacted with the mixture of boron precursor and solvent to form a precursor containing aluminum and boron. Alternatively, the precursor containing aluminum and boron may be formed by directly adding the boron precursor and the solvent to the alumina precursor without first preparing a separate mixture of the boron precursor and the solvent (e.g. $H_2O$). As used herein, the term "contact" encompasses actions such as combining, addition, mixing, blending, or stirring.

The forming of the precursor containing aluminum and boron may include forming a gel type precursor containing aluminum and boron in a sol type mixed solution in which the alumina precursor is dispersed into the mixture of the boron precursor and the solvent.

The mechanisms in the forming the precursor ($Al_x(OH)_y \cdot B_x \cdot (OH)_{y'}$) containing aluminum and boron may be described as shown in Reaction Formula 1:

[Reaction Formula 1]

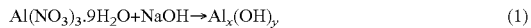  (1)

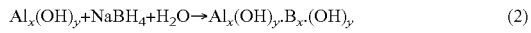  (2)

Next, the precursor containing aluminum and boron is heated to form the above-described nanostructure including boron-doped alumina.

The heat treatment may be performed at a temperature of about 800 degrees Celsius (° C.) to about 1300° C. for a time period of about 1 hour to about 10 hours in an inert gas atmosphere, an air atmosphere, or an oxygen atmosphere. For example, the heat treatment may be performed at about 800° C. to about 1000° C. for about 1 hour to about 5 hours in an inert atmosphere. The inert atmosphere may include argon gas, etc., and may additionally include a methane gas/hydrogen gas ($CH_4/H_2$) mixed gas in a volume ratio of about 1:4.

Figure 3:
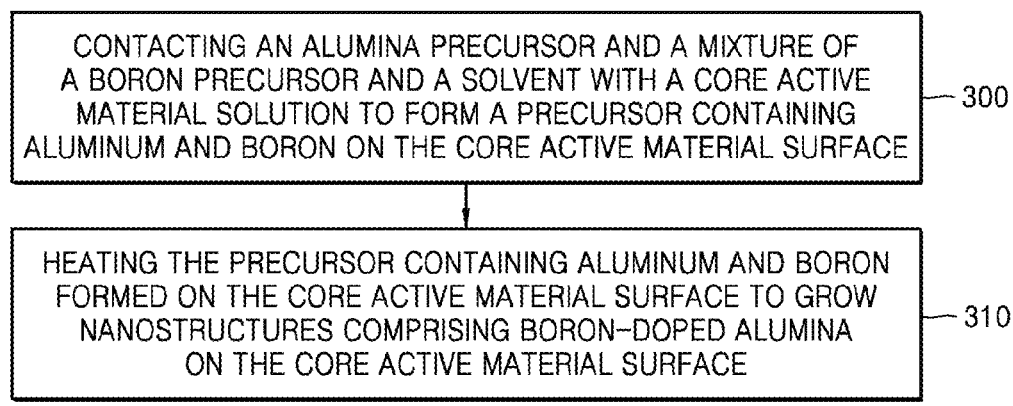
FIG. 3 is a flow chart of an embodiment of a method of preparing the electrode active material.

FIG. 3 is a flow chart of an embodiment of a method of preparing an electrode active material.

Referring to FIG. 3, the method of preparing an electrode active material includes contacting an alumina precursor and a mixture of a boron precursor and a solvent with a core active material solution to form a precursor containing aluminum and boron on the core active material surface (300). Subsequently, heating the precursor containing aluminum and boron formed on the core active material surface to grow nanostructures including boron-doped alumina on the core active material surface (310).

The method of preparing the electrode active material is further described as follows.

First, the core active material solution is prepared. The core active material solution is prepared by adding the above-described core active material to a solvent (e.g. water or NaOH) in an appropriate volume.

The alumina precursor and the mixture of the boron precursor and the solvent are altogether or sequentially added to the core active material solution to form a precipitate. The precipitate is filtered and washed with alcohol or/and deionized water to form a gel type precursor containing aluminum and boron on the core active material surface.

In the forming of the precursor containing aluminum and boron on the core active material surface (300), the aluminum may be present in an amount from about 0.1 parts by weight (pbw) to about 10 parts by weight, specifically, about 0.1 parts by weight to about 5 parts by weight, based on 100 parts by weight of the core active material. When aluminum is present in these amounts, nanostructures including boron-doped alumina which are disposed at an angle of 0 degrees to about 90 degrees with respect to a horizontal axis passing through a contact point on the core active material surface may be obtained in a final step of growing the nanostructures. An electrode active material including the nanostructures may have improved binding strength between a current collector and an electrode active material or/and between electrode active material particles.

In a specific example, aluminum contacted in the forming the precursor containing aluminum and boron may be present in a range of about 0.1 parts by weight to about less than 3 parts by weight, based on 100 parts by weight of the core active material. When aluminum is contacted in this content range, a plurality of nanostructures which are disposed at an angle of 0 degrees with respect to the horizontal axis passing through the contact point on the core active material surface, or which are disposed in parallel with the horizontal axis, may be obtained in a final step of growing the nanostructures. An electrode active material including the nanostructures may improve binding strength between the current collector and the electrode active material or/and between electrode active material particles by two or more times as compared to the core active material alone. An energy storage device including the electrode active material may also have improved bending durability. An energy storage device including the electrode active material may have improved lifetime characteristics which are about 5% or higher as compared to those of the core active material alone.

In another example, aluminum contacted in the step of forming the precursor containing aluminum and boron may be present in an amount of about 3 parts by weight to about 10 parts by weight, based on 100 parts by weight of the core active material. When aluminum is contacted in this content range, a plurality of nanostructures consisting of a combination of nanostructures which are disposed equally or differently at an angle of 0 degrees to about 90 degrees with respect to the horizontal axis passing through the contact point on the core active material surface, may be obtained in a final step of growing the nanostructures. An electrode active material including the nanostructures may have improved binding strength which is about 10% or higher than that of the core active material alone by increasing the number of contact points, or contact area, between adjacent electrode active material particles. Further, an energy storage device including the electrode active material may have improved lifetime characteristics which are about 3% or higher than those of the core active material.

The method of preparing the electrode active material further includes heating the precursor containing aluminum and boron formed on the core active material surface to grow nanostructures including boron-doped alumina on the core active material surface.

The heating is performed in the same method as described above. For example, the heating may be performed in a temperature range of about 800° C. to about 1300° C. for a time of about 1 hour to about 5 hours in an inert gas atmosphere, and in a methane gas/hydrogen gas ($CH_4/H_2$) mixed gas in a volume ratio of about 1:4. Under such heating conditions, nanostructures including high purity boron-doped alumina may be grown on the core active material surface.

The growing of the nanostructures including boron-doped alumina may further include the process of carbonizing the precursor containing aluminum and boron. The carbonizing process may be performed along with the process of growing the nanostructures including boron-doped alumina on the core active material surface through heating.

Mechanisms for the growing the nanostructures on the core active material surface are described as follows.

A boron-containing material, e.g., a boron hydride obtained from a mixture of a boron precursor and a solvent through heat treatment is melted at about 450° C. and becomes a liquid state. A liquid cluster type aluminum hydride grain is created by dispersing an aluminum-containing material obtained from an alumina precursor solution (e.g., aluminum hydride into boron hydride in the liquid state) while a temperature is increased. The aluminum hydride grain adsorbs the boron hydride in the liquid state and is quickly dispersed such that the aluminum hydride grain is grown in a predetermined direction without a catalyst on the core active material surface. Nanostructures including boron-doped alumina, e.g., $Al_{18}B_4O_{33}$ nanostructures, may be formed at a temperature of about 900° C. or higher.

Since the nanostructures including boron-doped alumina are the same as described above, the following description on the nanostructures including boron-doped alumina is omitted.

Hereinafter, an electrode active material, an electrode and an energy storage device including the same, and a method of preparing the electrode active material according to exemplary embodiments of the present disclosure are described more in detail through the following Examples and Comparative Examples. However, such embodiments are provided for illustrative purposes only, and the scope of the present invention should not be limited thereto in any manner. Further, it should be understood that the present disclosure is not limited to the above descriptions since other various modifications of the present disclosure may occur to persons having ordinary knowledge in the related art of the present disclosure.

EXAMPLES

Example 1: Preparation of Electrode Active Material

A core active material solution was prepared by preparing artificial graphite (3HE: 20.0±2.0, specific surface area: 3.2±0.5 $m^2/g$, Shanshan Co.) as a core active material, dispersing the artificial graphite into about 50 ml of distilled water, and adding about 0.04 g of NaOH to the dispersion.

About 0.278 g of $Al(NO_3)_3 \cdot 9H_2O$ (≥98%, Produced by Sigma Aldrich Corporation) was prepared.

About 0.2 g of $NaBH_4$ powder (≥98%. Produced by Sigma Aldrich Corporation) as a boron precursor was dissolved into about 50 ml of distilled water to prepare a mixture containing a boron precursor.

The alumina precursor $Al(NO_3)_3 \cdot 9H_2O$ (≥98%, Produced by Sigma Aldrich Corporation) and the mixture containing the boron precursor were sequentially put into the core active material solution to prepare a sol type mixed solution.

At this time, aluminum was added in an amount of about 1 parts by weight based on 100 parts by weight of the core active material, and a black precipitate was formed on the surface of the core active material. The precipitate formed on the core active material surface was filtered, the filtered precipitate was washed with ethanol and deionized water several time, and addition adducts were removed from the washed precipitate to form a gel type precursor which contained aluminum and boron and which was formed on the core active material surface.

A boron-doped alumina ($Al_{18}B_4O_{33}$) nanorod including a carbon coating layer grown on the core active material surface, was prepared by heating the gel type precursor containing aluminum and boron formed on the core active material surface at a temperature of about 900° C. under an Ar gas atmosphere having a gas flux of about 500 cubic centimeters per minute (sccm) in a furnace, and heating and carbonizing the heated gel type precursor at about 900° C., for about 2 hours, under a mixed gas atmosphere of $CH_4$ and $H_2$ in a volume ratio of about 1:4 and a total gas flux of about 500 sccm. The boron-doped alumina was contained in the boron-doped alumina ($Al_{18}B_4O_{33}$) nanorod in an amount ranging from about 1.08 parts by weight to about 2.17 parts by weight based on 100 parts by weight of the core active material. A boron doped alumina ($Al_{18}B_4O_{33}$) nanorod having an aspect ratio of about 5, a diameter of about 5 nm and a length of about 50 nm, including a carbon coating layer having a thickness of about 1.5 nm, thus was grown on the core active material.

Example 2: Preparation of Electrode Active Material

A gel type precursor which contained aluminum and boron and which was formed on the core active material surface was formed by adding aluminum in an amount of about 3 parts by weight based on 100 parts by weight of the core active material instead of adding aluminum in an amount of about 1 parts by weight based on 100 parts by weight of the core active material.

An electrode active material was prepared by performing the same method as in Example 1 except that a boron-doped alumina ($Al_{18}B_4O_{33}$) nanorod including a carbon coating layer grown on the core active material surface, was prepared by heating the gel type precursor which contained aluminum and boron formed on the core active material surface, at a temperature of about 900° C. under an Ar gas atmosphere having a gas flux of about 500 sccm in a furnace, and heating and carbonizing the heated gel type precursor at about 900° C. for about 2 hours under a mixed gas atmosphere of $CH_4$ and $H_2$ in a volume ratio of about 1:4 and had a total gas flux of about 500 sccm. A boron-doped alumina ($Al_{18}B_4O_{33}$) nanorod having an aspect ratio of about 10, a diameter of about 40 nm, and a length of about 400 nm, and including a carbon coating layer having a thickness of about 1.5 nm grown on the core, was prepared.

The boron-doped alumina was contained in the boron-doped alumina ($Al_{18}B_4O_{33}$) nanorod in an amount ranging from about 3.24 parts by weight to about 6.51 parts by weight based on 100 parts by weight of the core active material.

Comparative Example 1: Preparation of Electrode Active Material

An artificial graphite (3HE: 20.0±2.0, specific surface area: 3.2±0.5 $m^2/g$, Shanshan Co.) was prepared as an electrode active material.

Example 3: Manufacturing of Lithium Battery (Coin Cell)

After an electrode active material powder according to Example 1, styrene butadiene rubber (SBR), and carboxy methyl cellulose (CMC) were added at a weight ratio of 97.5:1.5:1.0, the electrode active material powder, styrene butadiene rubber (SBR), and CMC were uniformly mixed about 6 times in a C-mixer for about 2 minutes and 30 seconds to prepare a negative electrode slurry.

After coating the negative electrode slurry to a thickness of about 50 to about 60 μm on a copper foil having a thickness of about 10 μm by bar coating and drying the negative electrode slurry coated on the copper foil, the dried negative electrode slurry was again dried at about 120° C. under vacuum for about 2 hours to prepare a negative electrode plate. The negative electrode plate was pressed by a roll press to prepare a sheet type negative electrode for coin cells. The negative electrode had a capacity of about 3.0 milliampere-hour per square centimeter ($mAh/cm^2$) to about 3.5 $mAh/cm^2$.

A coin type half cell (CR2032 type) having a diameter of about 12 mm was manufactured using the negative electrode.

When manufacturing the coin type half cell (CR2032 type), a lithium metal was used as a counter electrode, and a lithium salt in which 1.15 molar (M) $LiPF_6$ and 0.2 M $LiBF_4$ were dissolved, and an additive in which about 5.0% by weight of fluoroethylene carbonate (FEC), about 0.5% by weight of vinyl ethylene carbonate (VEC), and about 3.0% by weight of succinonitrile (SN) were dissolved were used as an electrolyte.

Example 4: Manufacturing of Lithium Battery (Coin Cell)

A lithium battery (coin cell) was manufactured by the same method as in Example 3 except that an electrode active material powder according to Example 2 instead of an electrode active material powder according to Example 1 was used.

Comparative Example 2: Manufacturing of Lithium Battery (Coin Cell)

A lithium battery (coin cell) was manufactured by the same method as in Example 3 except that an electrode active material powder according to Comparative Example 1 instead of an electrode active material powder according to Example 1 was used.

Example 5: Manufacturing of Lithium Battery (Coin Cell)

After an electrode active material powder according to Example 1, styrene butadiene rubber (SBR), and carboxy methyl cellulose (CMC) were added at a weight ratio of about 97.5:1.5:1.0, the electrode active material powder, styrene butadiene rubber (SBR), and carboxy methyl cellulose (CMC) were uniformly mixed about 6 times in a C-mixer for about 2 minutes and 30 seconds to prepare a negative electrode slurry.

After coating the negative electrode slurry to a thickness of about 50 μm to about 60 μm on a copper foil having a thickness of about 10 μm by bar coating and drying the negative electrode slurry coated on the copper foil, the dried negative electrode slurry was dried again at about 120° C. under vacuum for about 2 hours to prepare a negative electrode.

Separately from this, $LiCoO_2$, a conducting agent Super-P produced by Timcal Co., Ltd., polyvinylidene fluoride (PVDF), and N-pyrrolidone were mixed to obtain a positive electrode composition. The positive electrode composition included $LiCoO_2$, the conducting agent, and PVDF mixed at a weight ratio of about 97:1.5:1.5.

After coating the positive electrode composition on an aluminum foil having a thickness of about 15 μm and drying the positive electrode composition coated on the aluminum foil at 25° C., the dried resulting material was dried again at about 110° C. under vacuum to prepare a positive electrode.

A pouch type lithium battery (full cell) having a capacity of about 60 mAh was prepared by disposing an electrolyte between the positive electrode and the negative electrode that were obtained according to the above-described processes, wherein a polyethylene/polypropylene separator was interposed between the positive electrode and the electrolyte, and a liquid electrolyte as the electrolyte was added. A lithium salt in which 1.15 M $LiPF_6$ and 0.2 M $LiBF_4$ were dissolved, and an additive in which about 5.0% by weight of FEC, about 0.5% by weight of VEC, and about 3.0% by weight of SN were dissolved, were used as the liquid electrolyte in a mixed solvent of ethylene carbonate (EC), ethyl methyl carbonate (EMC), and diethyl carbonate (DEC) mixed at a volume ratio of about 3:5:2.

Example 6: Manufacturing of Lithium Battery (Full Cell)

A lithium battery (full cell) was manufactured by the same method as in Example 5 except that an electrode active material powder according to Example 2 instead of an electrode active material powder according to Example 1 was used.

Comparative Example 3: Manufacturing of Lithium Battery (Full Cell)

A lithium battery (full cell) was manufactured by the same method as in Example 5 except that an electrode active material powder according to Comparative Example 1 instead of an electrode active material powder according to Example 1 was used.

Analysis Example 1: Analyses of SEM Images

Surfaces of electrode active materials according to Examples 1 and 2, and Comparative Example 1 were observed using a SEM (JEOL JSM-7600F). The observed results were shown in FIGS. 5A to 5C.

Figure 5A:
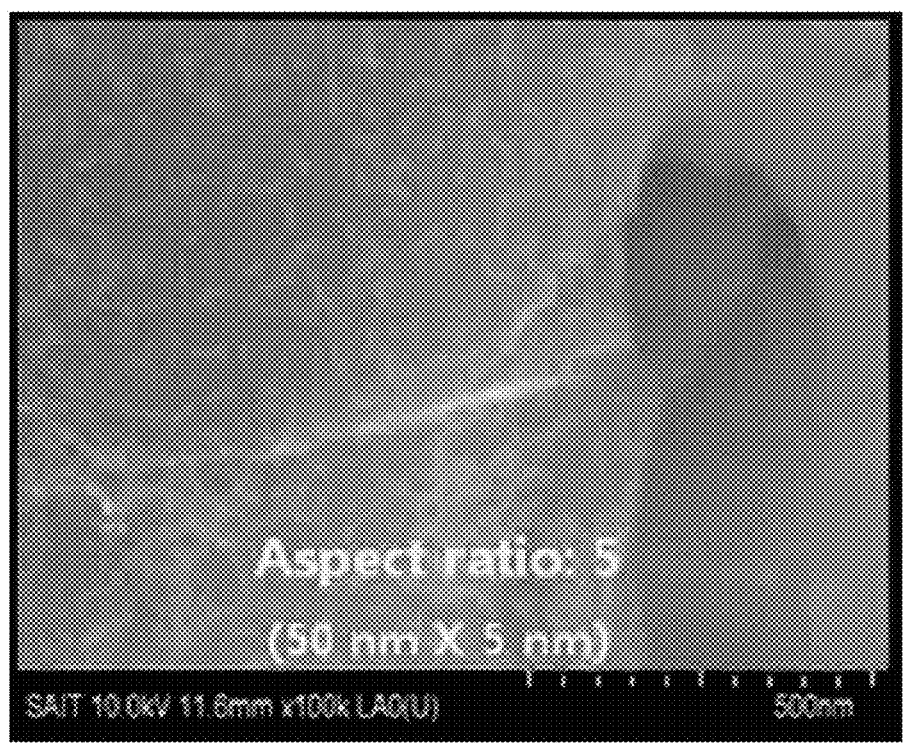
FIGS. 5A to 5C are each scanning electron microscope (SEM) images of the electrode active materials in accordance with Examples 1 and 2, and Comparative Example 1, respectively.
Figure 5B:
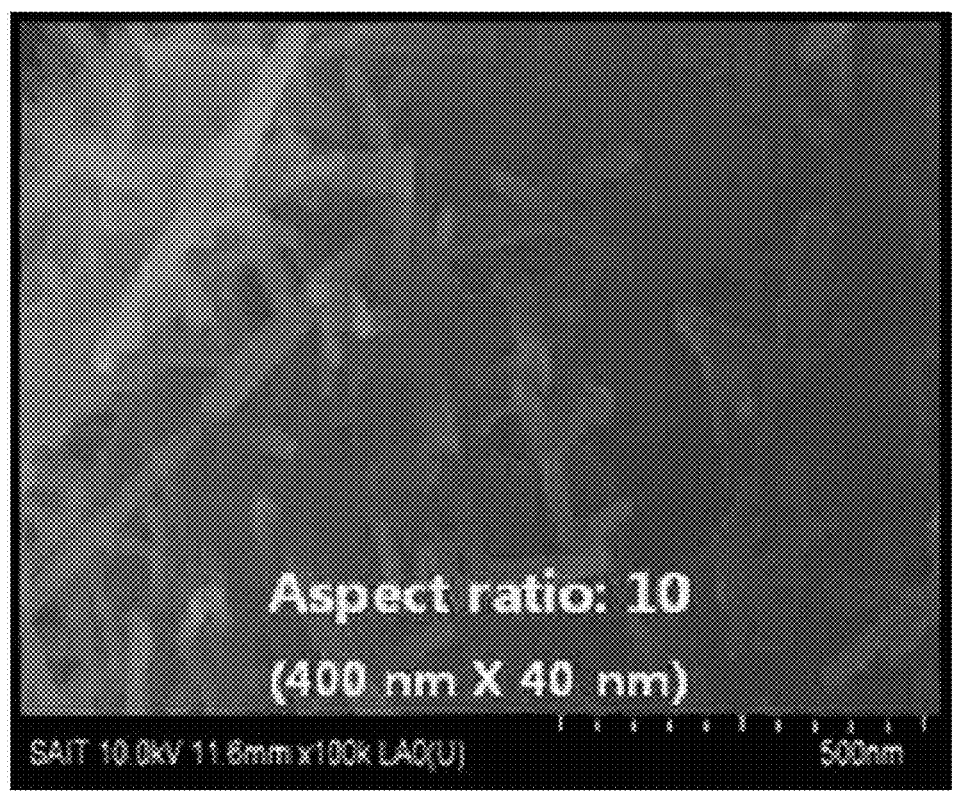

Referring to FIGS. 5A and 5B, it can be confirmed that about 5 nanorods having a uniform diameter of about 5 nm and a uniform length of about 50 nm and about 10 nanorods having a uniform diameter of about 40 nm and a uniform length of about 400 nm are respectively disposed on core active material surface of the electrode active materials according to Examples 1 and 2.

In the electrode active material according to Example 1, the plurality of nanorods are disposed at an angle of about 0 degrees with respect to a horizontal axis passing through the contact point on the core active material surface, or are disposed in parallel with the horizontal axis. In the electrode active material (negative electrode active material) according to Example 2, the plurality of nanorods are a combination of nanorods which are disposed equally or differently at an angle of 0 degrees to about 90 degrees with respect to the horizontal axis passing through the contact point on the core active material surface.

Figure 5C:
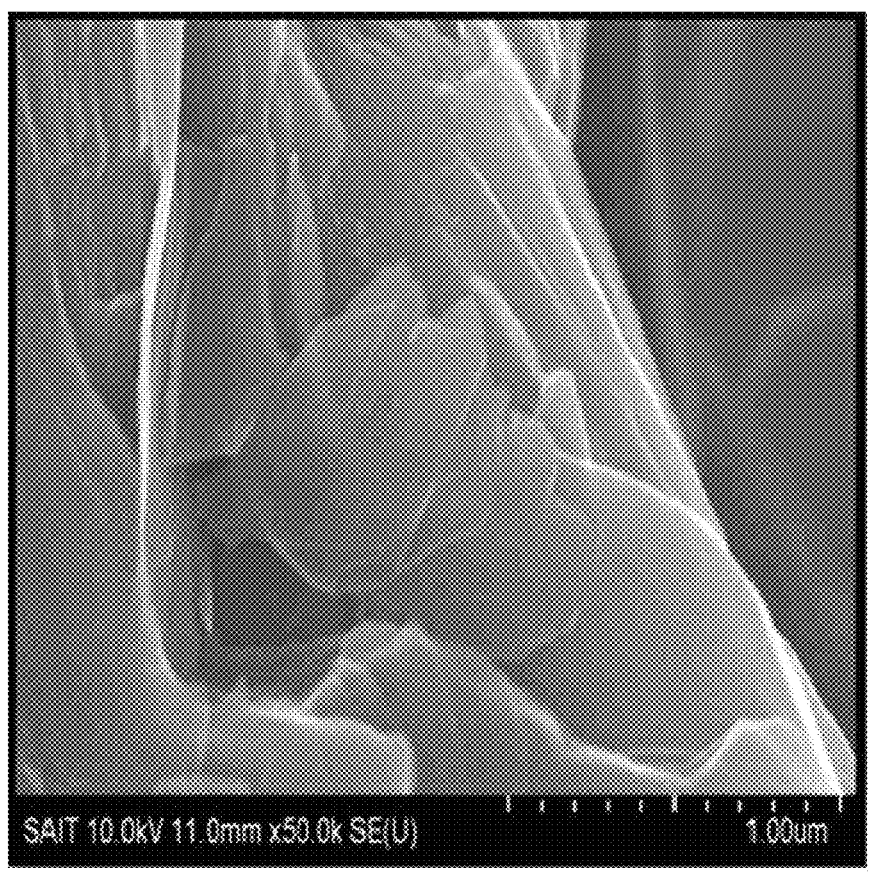

On the contrary, it can be confirmed by referring to FIG. 5C that nanorods do not exist on the core active material surface in the electrode active material according to Comparative Example 1.

Analysis Example 2: TEM Image Analyses

Nanorods disposed on the surface of the electrode active material according to Examples 2 were observed using a TEM (Titan G2). The observed results were represented in FIGS. 6A and 6B.

Figure 6A:
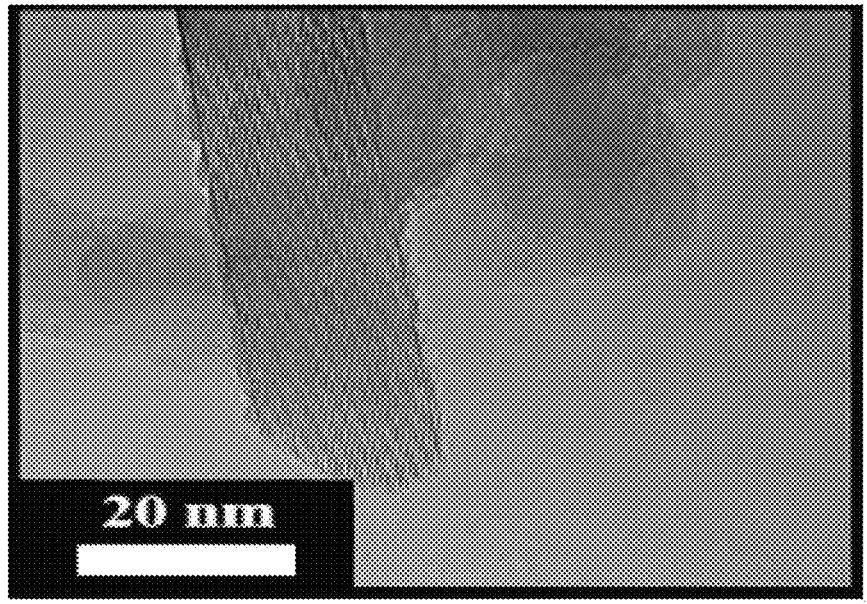
FIGS. 6A and 6B are each transmission electron microscope (TEM) images of the electrode active material according to Example 2.
Figure 6B:
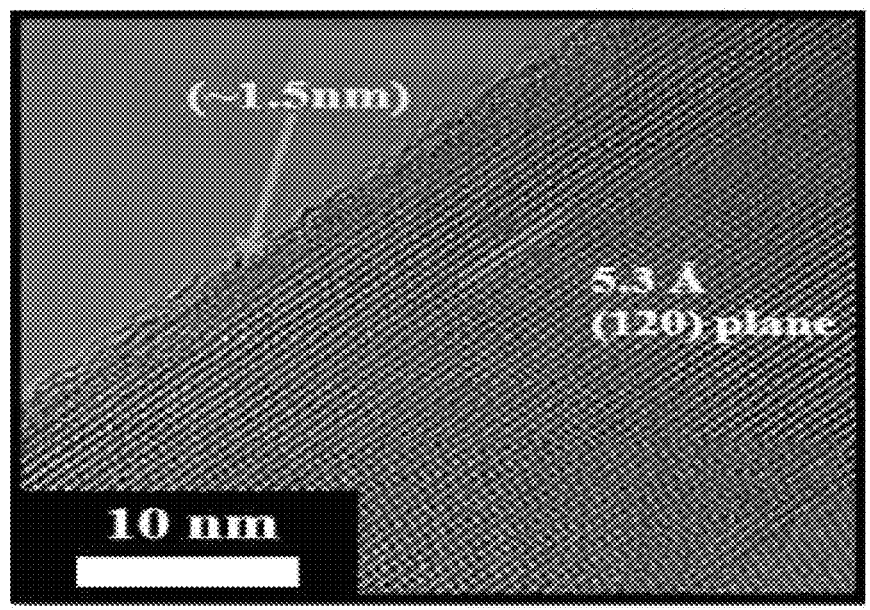

By referring to FIGS. 6A and 6B, it can be confirmed that the nanorods are formed in a single crystalline form, a (120) face has an interplanar distance, $d_{200}$, of about 5.3 Å. Further, it can be confirmed that a carbon based coating layer having a thickness of about 1.5 nm exists on the surfaces of the nanorods.

Analysis Example 3: XRD Analyses

XRD tests were performed on the electrode active materials according to Example 2 and Comparative Example 1. Parts of the test results were shown in FIG. 7. An XRD device used in the tests was a CuK-alpha characteristic X-ray wavelength of about 1.541 angstrom (Å).

Figure 7:
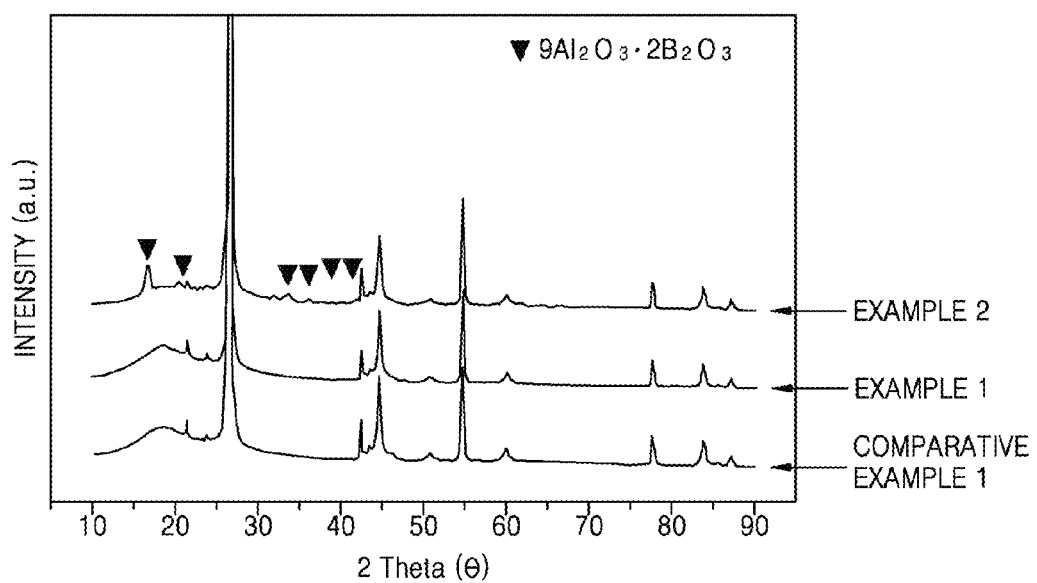
FIG. 7 is a graph of the diffraction angle ($2\theta$) versus intensity (arbitrary unit, a.u.) which shows X-ray diffraction (XRD) analysis results for the electrode active materials according to Example 1, Example 2 and Comparative Example 1.

Referring to FIG. 7, it can be confirmed from the electrode active material according to Example 2 that a diffraction peak corresponding to a (120) crystal face derived from an orthorhombic structure of a boron-doped alumina ($Al_{18}B_4O_{33}$) nanorod is clearly shown at a diffraction angle 2θ of about 17.0 degrees±0.50 degree, and diffraction peaks corresponding to a (002) crystal face and a (240) crystal face derived from the orthorhombic structure of the boron-doped alumina nanorod are weakly shown at diffraction angles of about 34.0 degrees±0.50 degree and about 36.0 degrees±0.50 degree respectively.

On the other hand, any diffraction peak corresponding to a crystal face derived from the orthorhombic structure of the boron-doped alumina ($Al_{18}B_4O_{33}$) nanorod is not observed in the electrode active material according to Comparative Example 1.

Analysis Example 4: XPS Analyses

XPS tests were performed on the electrode active materials according to Examples 1 and 2, and Comparative Example 1. The test results were shown in FIGS. 8A to 8C.

An XPS device used in the tests was Quantum 2000 produced by Physical Electronics Inc. having an acceleration voltage of about 0.5 to 15 keV at about 300 W, an energy resolution of about 1.0 eV, a minimum analysis range of about 10 microns, and a sputter rate of about 0.1 nm/min.

Figure 8A:
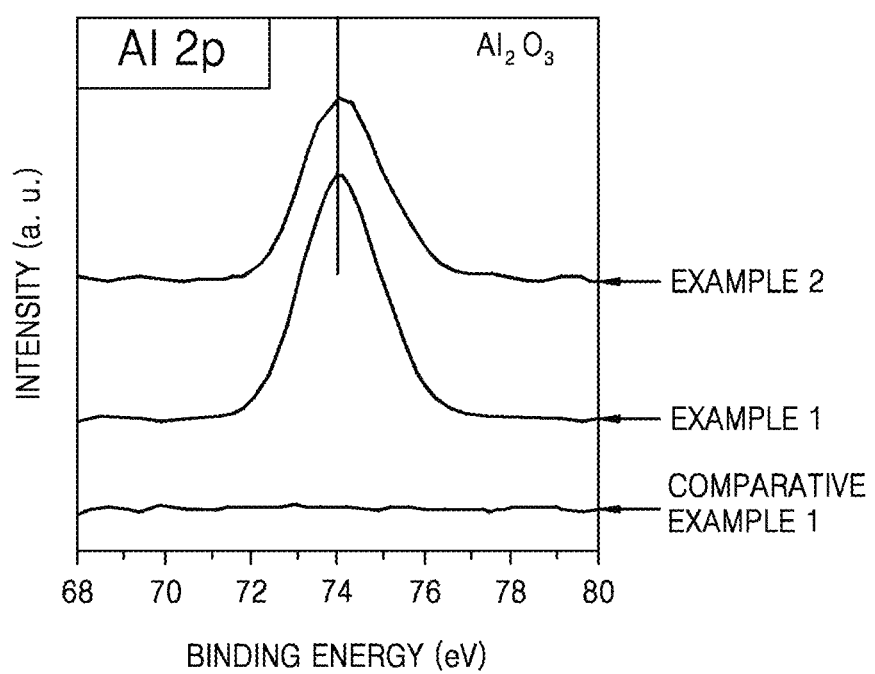
FIGS. 8A to 8C are each a graph of the binding energy (electron volts, eV) versus intensity (a.u.) which shows X-ray photoelectron spectroscopy (XPS) spectrum test results for the electrode active materials according to Examples 1 and 2, and Comparative Example 1.
Figure 8B:
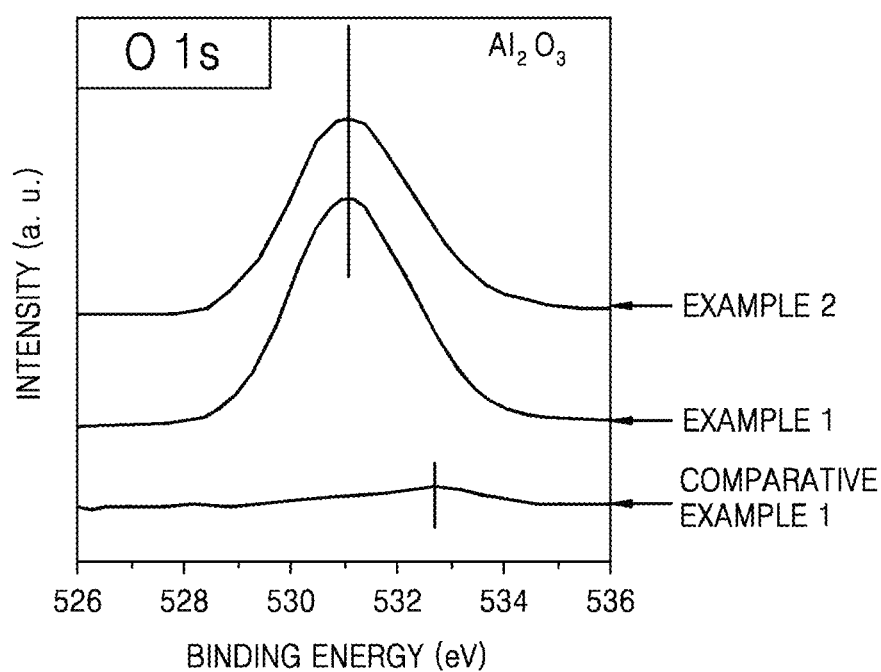
Figure 8C:
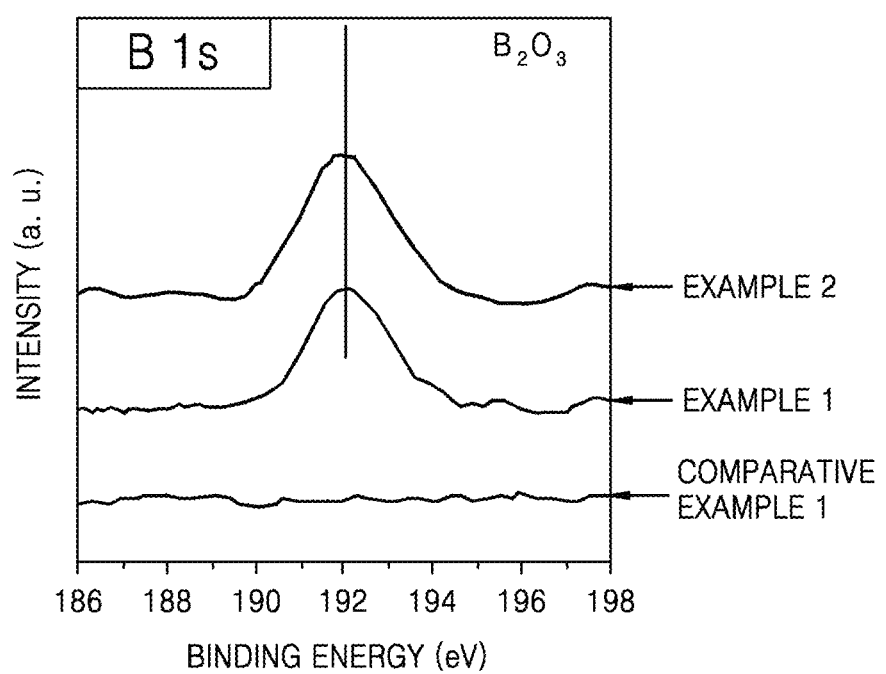

Referring to FIGS. 8A to 8C, a peak at a binding energy of about 72 electron volt (eV) to about 75 eV, a peak at a binding energy of about 530.8 eV to about 531.5 eV, and a peak at a binding energy of about 191.8 eV to about 912.4 eV can be confirmed in an Al2p XPS spectrum (FIG. 8A), an O1s XPS spectrum (FIG. 8B), and a B1s XPS spectrum (FIG. 8C) obtained by XPS analyses of the electrode active materials according to Examples 1 and 2.

On the other hand, any peaks at the binding energy of about 72 eV to about 75 eV, the binding energy of about 530.8 eV to about 531.5 eV, and the binding energy of about 191.8 eV to about 912.4 eV were not confirmed in the Al2p XPS spectrum, the O1s XPS spectrum, and the B1s XPS spectrum obtained by XPS analyses of the electrode active material according to Comparative Examples 1.

From this time, it can be confirmed that the electrode active materials according to Examples 1 and 2 include a boron-doped alumina ($Al_{18}B_4O_{33}$) nanorod.

Evaluation Example 1: Binding Strength Evaluation 1-1. Evaluation of Binding Strength Between a Negative Electrode Active Material and a Current Collector Prior to vacuum drying, negative electrodes used in manufacturing coin type half cells (CR2032 type) according to Examples 3 and 4, and Comparative Example 2 were cut to a size of about 25 mm×25 mm to obtain specimens. The specimens were placed under surfaces of negative electrode active material layers, and double sided cellophane tapes were adhered to the surface of the negative electrode active material layers. Double sided cellophane tapes produced by 3M Corporation were used. The double sided cellophane tapes were fixed to a glass test desk. Thereafter, ends of the current collectors were pulled at a tension rate of about 100 mm/min in a vertical upward direction, and stress values were measured when the current collectors were stripped. The measurement process was performed three times to obtain average stress values such that the relevant average stress values were evaluated as binding strength values between the negative electrode active materials and the current collectors. The evaluation results were represented in the following Table 1 and FIG. 9A.

At this time, a measuring device used in evaluating binding strength values was a tensile strength tester (Instron 3342, produced by Shimadzu Corporation) having a load capacity of about 50 kilogram force (kgf), and an 180 degrees of an angle peel-off test was used as a measuring method.

TABLE 1

| Classification | Binding strength (gf/mm) between negative electrode active material and current collector |
|---|---|
| Example 3 | 0.89 |
| Example 4 | 0.14 |
| Comparative Example 2 | 0.52 |

Figure 9A:
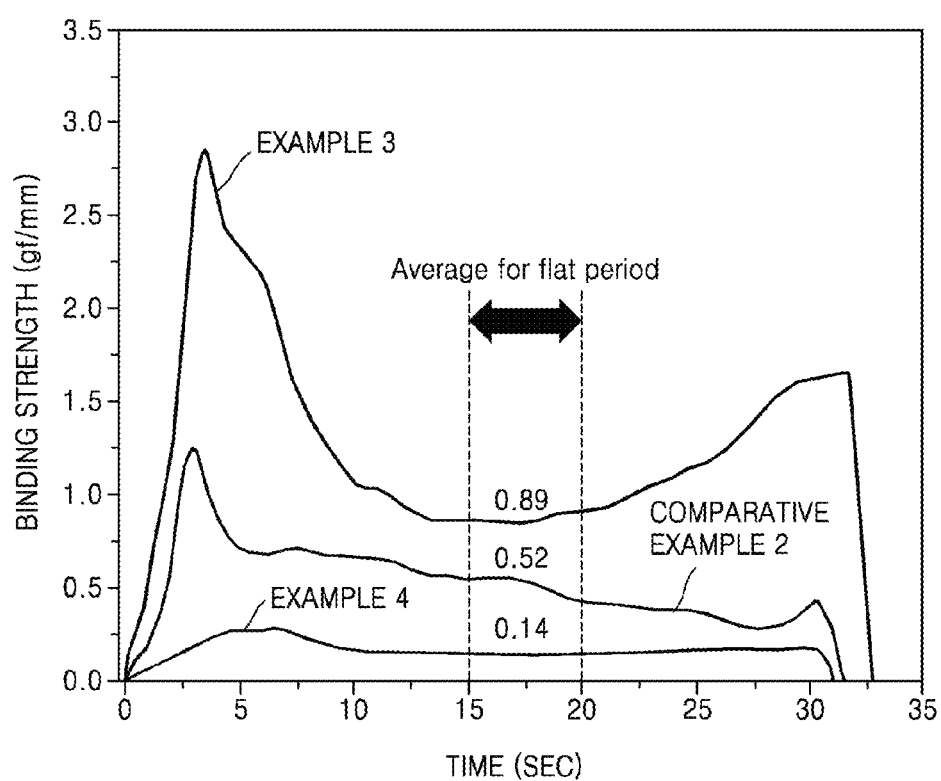
FIG. 9A is a graph of time (seconds, sec) versus binding strength (gram force per millimeter, gf/mm) which shows the results of binding strength values between a current collector and a negative electrode active material of a negative electrode used in manufacturing coin type half cells (CR2032 type) according to Examples 3 and 4, and Comparative Example 2.

Referring to Table 1 and FIG. 9A, it can be confirmed that binding strength between a current collector and a negative electrode active material of a negative electrode used in manufacturing a coin type half cell (CR2032 type) according to Example 3, was improved by as much as 71% compared to that between a current collector and a negative electrode active material of a negative electrode used in manufacturing the coin type half cell (CR2032 type) according to Comparative Example 2.

1-2 Evaluation of Binding Strength Values Between Negative Electrode Active Materials Specimens were obtained by removing copper foils from negative electrode specimens before vacuum drying used in manufacturing the coin type half cells (CR2032 type) according to Examples 3 and 4, and Comparative Example 2 used in 1-1. Double sided cellophane tapes having an electrode area of about 20 mm×20 mm were adhered to surfaces of the specimens. The double sided cellophane tapes were also adhered to a polyethylene porous substrate GC0910 having a thickness of about 9 μm produced by Toray BSF Corporation. Double sided cellophane tapes produced by 3M Corporation were used as the double sided cellophane tapes. Separately, double sided cellophane tapes having a specimen size were fixed to a glass test desk as described in 1-1. Thereafter, stress values were measured when the polyethylene porous substrates were stripped after ends of polyethylene porous substrates were pulled at a tension rate of about 100 millimeters per minute (mm/min) in a vertical upward direction. The measurement process was performed three times to obtain average stress values such that the relevant average stress values were evaluated as binding strength values between the negative electrode active materials. The evaluation results were represented in the following Table 2 and FIG. 9B.

At this time, a measuring device used in evaluating binding strength values was a tensile strength tester LR5K Plus having a load condition of about 500 kg produced by Lloyd-X Corporation, and a pull to limit test based on ISO Standard #40/0648 was used as a measuring method.

TABLE 2

| Classification | Binding strength (*gf/mm$^2$) between negative electrode active material and current collector |
|---|---|
| Example 3 | 53.1 |
| Example 4 | 43.0 |
| Comparative Example 2 | 37.3 |

*gram force per square millimeter

Figure 9B:
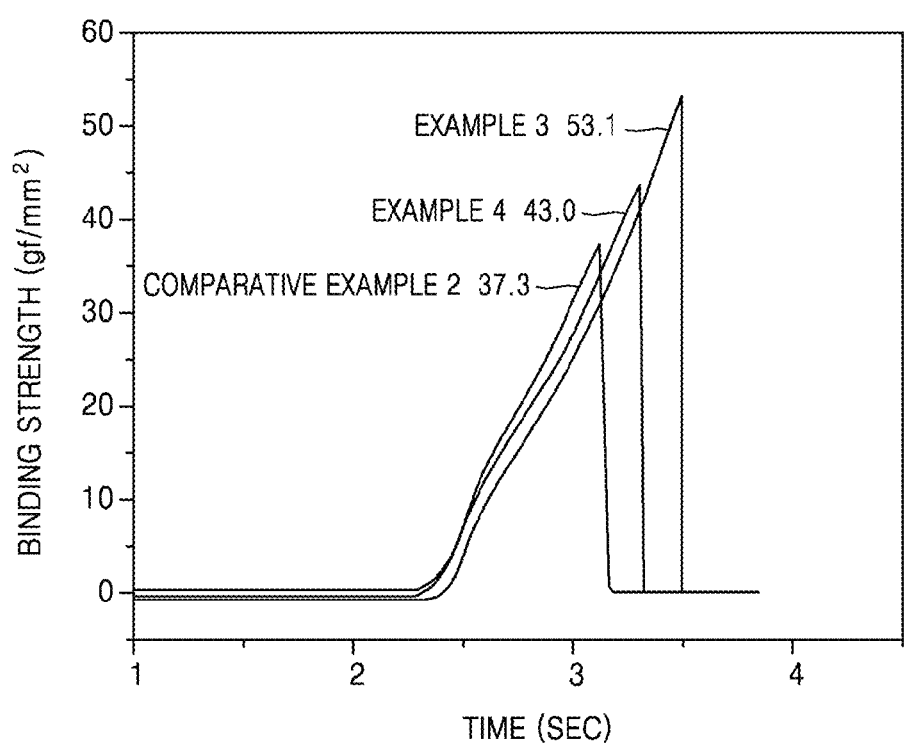
FIG. 9B is a graph of time (sec) versus binding strength (gf/mm) which shows the results of binding strength values between a negative electrode active material and a negative electrode active material of a negative electrode used in manufacturing coin type half cells (CR2032 type) according to Examples 3 and 4, and Comparative Example 2.

Referring to Table 2 and FIG. 9B, it can be confirmed that binding strength values between negative electrode active materials and negative electrode active materials of negative electrodes used in manufacturing coin type half cells (CR2032 type) according to Examples 3 and 4 were improved as much as about 42% and about 15% respectively compared to that between a negative electrode active material and a negative electrode active material of a negative electrode used in manufacturing a coin type half cell (CR2032 type) according to Comparative Example 2.

Evaluation Example 2: Bending Test Evaluation—Durability

Bending test evaluation was performed on lithium batteries (full cells) according to Example 5 and Comparative Example 3 as specimens. The lithium batteries (full cells) used as the specimens had a size of about 28 mm×110 mm. The bending test was performed by mounting a bending test device on a universal tester, and applying a load to central portions of the specimens such that the specimens had a radius curvature of about 25 R while supporting both ends of the specimens, thereby pressing and bending the specimens 20,000 times. Thereafter, stripped percentage (%) was obtained based on total areas of the batteries used as the specimens to evaluate durability of the batteries. The durability evaluation results were represented in the following Table 3.

At this time, a bending test device (SMDC, SAIT-FB Tester) was used in bending tests.

TABLE 3

| Classification | Stripped percentage (%, based on total areas of batteries for specimens) |
|---|---|
| Example 5 | 2.3 |
| Comparative Example 3 | 8.1 |

The stripped percentage of a lithium battery (full cell) according to Example 5 was decreased as much as about 5.8% compared to a lithium battery (full cell) according to Comparative Example 3. It can be confirmed from this that a durability of the lithium battery (full cell) according to Example 5 was improved than that of the lithium battery (full cell) according to Comparative Example 3.

Evaluation Example 3: Evaluation of Charge/Discharge Characteristics—Lifetime Characteristics Constant current charging processes of coin type half cells (CR2032 type) according to Examples 3 and 4, and Comparative Example 2 were performed to a current of about 0.1 C rate at about 25° C. until a voltage reached about 0.01 V (vs. Li), and then the coin type half cells passing through the constant current charging processes were cutoff at a current of about 0.01 C rate while maintaining the voltage of about 0.01 V in a constant voltage mode. Subsequently, the cutoff coin type half cells were discharged to a constant current of about 0.1 C rate until the voltage reached about 1.0 V (vs. Li) during discharging (the first cycle in the formation step). Such charging and discharging processes, in each of which a pause time of about 10 minutes was included, were performed four cycles more to complete the chemical conversion process. Charge/discharge characteristics of the coin type half cells were evaluated by a charger and discharger TOYO-3100 produced by TOYO Corporation. The "C" as a discharge rate of a cell, means a value obtained by dividing the total capacity of the cell by the total discharge time.

Figure 10:
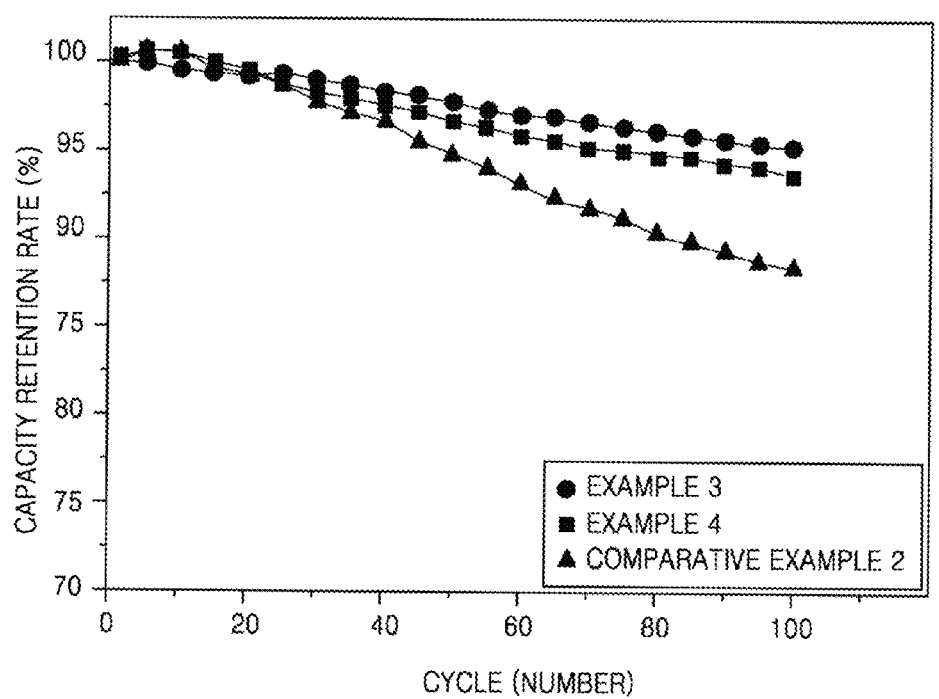
FIG. 10 is a graph of cycle (number) versus capacity retention (%) which shows the capacity retention rates obtained at the $100^{th}$ cycle in a voltage range of about 3.0 volts (V) to about 4.4 V at about 25° C. as compared to lithium metal, with respect to coin type half cells (CR2032 type) according to Examples 3 and 4, and Comparative Example 2.

After constant current charging processes of the coin type half cells (CR2032 type) passing through the formation step were performed to constant current/constant voltage of about 0.5 C at about 25° C. in a voltage range of about 0.01 V to about 1.0 V (vs. Li), constant current discharging processes of the coin type half cells passing through the constant current charging processes were performed to a constant current of about 0.5 C until the voltage reached about 1.0 V of a cutoff voltage. Thereafter, the same charging and discharging processes were performed 96 cycles to repeatedly perform the charging and discharging processes totally 100 cycles. Results of the charging and discharging processes are represented in FIG. 10. Capacity retention rates were calculated from the following Mathematical Equation 1. The calculation results were represented in the following Table 4:

Capacity retention rate (%)=(discharge capacity at the 100$^{th}$ cycle/discharge capacity at the first cycle)×100  <Mathematical Equation 1>

TABLE 4

| Classification | Capacity retention rates (%) at the 100$^{th}$ cycle |
|---|---|
| Example 3 | 95.0 |
| Example 4 | 93.1 |
| Comparative Example 2 | 88.4 |

Referring to Table 4, it can be confirmed that capacity retention rates at the 100$^{th}$ cycle of the coin type half cells (CR2032 type) according to Examples 3 and 4 were improved by as much as about 6.6% and about 4.7% respectively compared to that of the coin type half cell (CR2032 type) according to Comparative Example 2. It can be confirmed from this that lifetime characteristics of the coin type half cells (CR2032 type) according to Examples 3 and 4 were improved compared to those of the coin type half cell (CR2032 type) according to Comparative Example 2.

An electrode active material according to an aspect of the present disclosure may have improved binding strength by including nanostructures including boron-doped alumina. Further, an energy storage device including the electrode active material may have improved durability and lifetime characteristics. Further, a method of preparing the electrode active material can easily prepare an electrode active material including uniform sized nanostructures.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrode active material comprising a nanostructure comprising a boron-doped alumina, and
further comprising:
a core active material,
wherein the nanostructure is disposed on a surface of the core active material, and
wherein the boron-doped alumina comprises boron-doped alumina represented by Formula 1:

$Al_xB_yO_z$     [Formula 1]

wherein 1≤x<30, 1≤y<10, and 1≤z<40.

2. The electrode active material of claim 1, wherein the electrode active material comprises a composite.

3. The electrode active material of claim 1, wherein the nanostructure is at least one of a nanowire, a nanorod, a nanobelt, and a nanoribbon.

4. The electrode active material of claim 1, wherein the nanostructure has an aspect ratio of about 1 to about 200.

5. The electrode active material of claim 1, wherein the boron-doped alumina comprises at least one of $AlBO_3$, $Al_4B_2O_9$, $Al_5BO_9$, and $Al_{18}B_4O_{33}$.

6. The electrode active material of claim 1, wherein the nanostructure is disposed at an angle of 0 degrees to about 90 degrees with respect to a horizontal axis passing through a contact point on the core active material surface.

7. The electrode active material of claim 1, wherein the nanostructure comprises a plurality of nanostructures, and the plurality of nanostructures are disposed at an angle of 0 degrees with respect to a horizontal axis passing through a contact point on the surface of the core active material or are disposed in parallel to the horizontal axis.

8. The electrode active material of claim 1, wherein the nanostructure comprises a plurality of nanostructures, and the plurality of nanostructures are disposed at an angle of 0 degrees to about 90 degrees with respect to a horizontal axis passing through a contact point on the core active material surface, and
wherein the plurality of nanostructures are disposed at angles equal to or different from one another.

9. The electrode active material of claim 1, wherein the core active material comprises an active material capable of intercalating and deintercalating lithium ions.

10. The electrode active material of claim 9, wherein the active material comprises at least one of a metal oxide, a metal composite oxide, a lithium metal oxide, a lithium metal composite oxide, a carbonaceous material, silicon, a silicon oxide, tin, and a tin oxide.

11. The electrode active material of claim 10, wherein the carbonaceous material comprises at least one of natural graphite, artificial graphite, soft carbon, hard carbon, mesophase pitch carbide, and calcined cokes.

12. The electrode active material of claim 1, wherein the nanostructure comprises aluminum in an amount from about 0.1 parts by weight to about 99.99 parts by weight based on 100 parts by weight of the core active material.

13. The electrode active material of claim 1, wherein the nanostructure comprises aluminum in an amount ranging from about 0.1 parts by weight to about 20 parts by weight based on 100 parts by weight of the core active material.

14. The electrode active material of claim 1, wherein the electrode active material further comprises a carbon based coating layer formed on a surface of the nanostructure.

15. The electrode active material of claim 14, wherein the carbon based coating layer has a thickness of about 0.1 nm to about 10 nm.

16. An electrode comprising:
a current collector; and
a layer formed on the current collector, the layer comprising the electrode active material according to claim 1.

17. An energy storage device comprising the electrode according to claim 16.

18. A method of preparing an electrode active material comprising:
contacting an alumina precursor with a mixture of a boron precursor and a solvent to form a precursor containing aluminum and boron; and
heating the precursor containing aluminum and boron to form a nanostructure comprising a boron-doped alumina, and
further comprising:
a core active material,
wherein the nanostructure is disposed on a surface of the core active material, and
wherein the boron-doped alumina comprises boron-doped alumina represented by Formula 1:

$Al_xB_yO_z$     [Formula 1]

wherein 1≤x<30, 1≤y<10, and 1≤z<40.

19. The method of claim 18, wherein the boron precursor is $NaBH_4$.

20. The method of claim 18, wherein the forming the precursor containing aluminum and boron comprises forming a gel type precursor containing aluminum and boron in a sol type mixed solution in which the alumina precursor is dispersed into the mixture of the boron precursor and the solvent.

21. The method of claim 18, further comprising:
contacting the alumina precursor and the mixture of the boron precursor and the solvent with a core active material solution to form a precursor containing aluminum and boron on a core active material surface; and
heating the precursor containing aluminum and boron on the core active material surface to grow nanostructures comprising boron-doped alumina on the core active material surface.

22. The method of claim 21, wherein aluminum in the precursor containing aluminum and boron is present in an amount from about 0.1 parts by weight to about 10 parts by weight based on 100 parts by weight of the core active material.

23. The method of claim 21, wherein the heat treatment is performed at a temperature of about 800° C. to about 1300° C. in an inert gas atmosphere comprising a mixture of methane gas and hydrogen gas.

24. The method of claim 18, wherein the forming of the nanostructures further comprises heating and carbonizing the precursor containing aluminum and boron.

\* \* \* \* \*